(12) United States Patent
Kamo et al.

(10) Patent No.: US 9,056,629 B2
(45) Date of Patent: Jun. 16, 2015

(54) PERSONAL VEHICLE CONTROL DEVICE

(71) Applicant: AISIN SEIKI KABUSHIKI KAISHA, Kariya-shi (JP)

(72) Inventors: Mitsuhiro Kamo, Okazaki (JP); Yu Banno, Maryville, TN (US); Osamu Matsumoto, Tsukuba (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 112 days.

(21) Appl. No.: 13/837,572

(22) Filed: Mar. 15, 2013

(65) Prior Publication Data
US 2013/0253769 A1  Sep. 26, 2013

(30) Foreign Application Priority Data

Mar. 26, 2012 (JP) ................................. 2012-068750
Feb. 6, 2013 (JP) ................................. 2013-021008

(51) Int. Cl.
| B62D 11/00 | (2006.01) |
| A61G 5/04 | (2013.01) |
| G05B 15/00 | (2006.01) |
| A61G 5/10 | (2006.01) |

(52) U.S. Cl.
CPC ............... *B62D 11/003* (2013.01); *A61G 5/04* (2013.01); *G05B 15/00* (2013.01); *A61G 2005/1086* (2013.01); *A61G 2203/14* (2013.01); *A61G 2203/42* (2013.01); *Y02T 10/7258* (2013.01)

(58) Field of Classification Search
CPC .......... B60W 30/02; B60W 2030/043; B60W 2030/045; B60W 40/10; B60W 40/105; B60W 40/109; B60W 40/114; B60C 23/0489; B60C 23/06; B60C 23/061

USPC .......................................... 701/36, 38, 41–44
See application file for complete search history.

(56) References Cited

U.S. PATENT DOCUMENTS

| 6,615,937 | B2 * | 9/2003 | Richey et al. .................. 180/6.5 |
| 8,666,575 | B2 * | 3/2014 | Kosaka et al. .................. 701/22 |
| 2001/0006125 | A1 * | 7/2001 | Richey et al. .................. 180/6.5 |
| 2002/0011361 | A1 * | 1/2002 | Richey et al. .................. 180/6.5 |
| 2007/0208483 | A1 * | 9/2007 | Rabin .............................. 701/72 |

(Continued)

FOREIGN PATENT DOCUMENTS

| JP | 2003-52760 | 2/2003 |
| JP | 2004-120875 | 4/2004 |

(Continued)

*Primary Examiner* — Thomas G Black
*Assistant Examiner* — Sara Nelson
(74) *Attorney, Agent, or Firm* — Oblon, McClelland, Maier & Neustadt, L.L.P.

(57) ABSTRACT

A personal vehicle control device includes an operation portion for inputting an original command value related to a turning angle, an axis angle sensor for detecting physical quantities related to a roll angle and a turning angle, wheel sensors, and a control portion. The control portion executes at least one of a first calculation law in which an actual command value related to a rotation angular velocity for driving wheels is obtained on the basis of a roll angle and the original command value, and a second calculation law in which the actual command value is obtained on the basis of an integrated value of a difference and/or an integrated value which is an integral of a ratio between the command value related to the turning angle and the physical quantity related to the turning angle with respect to time and on the basis of the original command value.

8 Claims, 11 Drawing Sheets

(56) References Cited

U.S. PATENT DOCUMENTS

2008/0290618 A1* 11/2008 Yanaka et al. ............... 280/6.15
2010/0138128 A1* 6/2010 Strothmann et al. ............ 701/72
2013/0080015 A1* 3/2013 Strothmann et al. ............ 701/72

FOREIGN PATENT DOCUMENTS

| | | |
|---|---|---|
| JP | 2010-63684 | 3/2010 |
| JP | 2010-193939 | 9/2010 |

\* cited by examiner

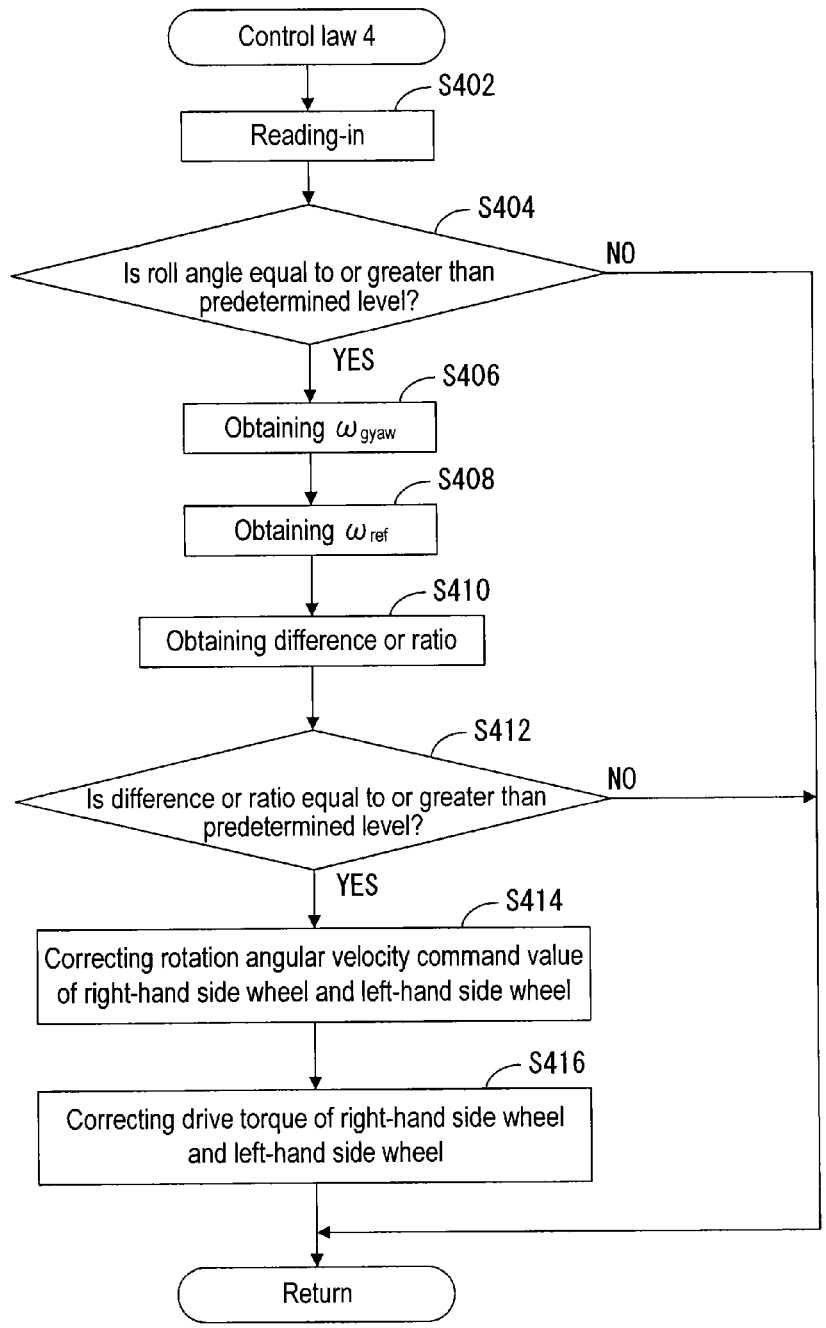

FIG. 12

[Mathematical Formula 1] $\quad \dot{\theta}_{R\_ref} = \dfrac{V_{ref}}{R_{\_r}} + \dfrac{T}{2R_{\_r}} \omega_{ref}$

FIG. 13

[Mathematical Formula 2] $\quad \dot{\theta}_{L\_ref} = \dfrac{V_{ref}}{R_{\_l}} - \dfrac{T}{2R_{\_l}} \omega_{ref}$

FIG. 14

[Mathematical Formula 3]

$$T_R = K_{VR}(\dot{\theta}_R - \dot{\theta}_{R\_ref}) + K_{PR}(\theta_R - \int \dot{\theta}_{R\_ref} dt)$$

FIG. 15

[Mathematical Formula 4]

$$T_L = K_{VL}(\dot{\theta}_L - \dot{\theta}_{L\_ref}) + K_{PL}(\theta_L - \int \dot{\theta}_{L\_ref} dt)$$

FIG. 16

[Mathematical Formula 5] $\quad R_{\_r} = R_{\_l} = R$

FIG. 17

[Mathematical Formula 6] $\quad V_{acc} = \int (a_{ccx} - g \sin \alpha_x) dt$

FIG. 18

[Mathematical Formula 7] $\quad \dot{\theta}_R = \dot{\theta}_L = \dot{\theta}$

FIG. 19

[Mathematical Formula 8] $\quad Z = \dfrac{V_{acc}}{V_{en}} > (1+\beta)$

FIG. 20

[Mathematical Formula 9] $\quad Z = \dfrac{V_{acc}}{V_{en}} < (1-\beta)$

FIG. 21

[Mathematical Formula 10] $\quad R_{\_new} = R \times \dfrac{V_{acc}}{V_{en}}$

FIG. 22

[Mathematical Formula 11] $\quad D_{abs} = \left|\omega_{gyaw} - \omega_{en}\right| > \beta_{\omega}$

FIG. 23

[Mathematical Formula 12]
$$R_{\_diff\_new} = \dfrac{(\omega_{gyaw} - \omega_{en})}{\dot{\theta}} \times T$$

FIG. 24

[Mathematical Formula 13]

$$R_{\_r} = R_{\_new} + \frac{R_{\_diff\_new}}{2}$$

FIG. 25

[Mathematical Formula 14]

$$R_{\_l} = R_{\_new} - \frac{R_{\_diff\_new}}{2}$$

FIG. 26

[Mathematical Formula 15]

$$\theta_i = \int (\omega_{ref} - \omega_{gyaw}) dt$$

FIG. 27

[Mathematical Formula 16]

$$\dot{\theta}_{R\_ref} = \frac{V_{ref}}{R_{\_r}} + \frac{T}{2R_{\_r}} \omega_{ref} + K_\omega (\omega_{ref} - \omega_{gyaw}) + K_{\omega i} \theta_i + K_r \alpha_y$$

FIG. 28

[Mathematical Formula 17]

$$\dot{\theta}_{L\_ref} = \frac{V_{ref}}{R_{\_l}} - \frac{T}{2R_{\_l}} \omega_{ref} - K_\omega (\omega_{ref} - \omega_{gyaw}) - K_{\omega i} \theta_i - K_r \alpha_y$$

FIG. 29

[Mathematical Formula 18]

$$\dot{\theta}_{R\_ref} = \frac{V_{ref}}{R} + \frac{T}{2R} \omega_{ref} + K_r \alpha_y$$

FIG. 30

[Mathematical Formula 19]

$$\dot{\theta}_{L\_ref} = \frac{V_{ref}}{R} - \frac{T}{2R} \omega_{ref} - K_r \alpha_y$$

FIG. 31
[Mathematical Formula 20]
$$\dot{\theta}_{R\_ref} = \frac{V_{ref}}{R} + \frac{T}{2R}\omega_{ref} + K_{\omega i}\theta_i$$

FIG. 32
[Mathematical Formula 21]
$$\dot{\theta}_{L\_ref} = \frac{V_{ref}}{R} - \frac{T}{2R}\omega_{ref} - K_{\omega i}\theta_i$$

FIG. 33
[Mathematical Formula 22]
$$\dot{\theta}_{R\_ref} = \frac{V_{ref}}{R} + \frac{T}{2R}\omega_{ref} + K_{\omega i}\theta_i + K_r\alpha_y$$

FIG. 34
[Mathematical Formula 23]
$$\dot{\theta}_{L\_ref} = \frac{V_{ref}}{R} - \frac{T}{2R}\omega_{ref} - K_{\omega i}\theta_i - K_r\alpha_y$$

FIG. 35
[Mathematical Formula 24]
$$\dot{\theta}_{R\_ref} = \frac{V_{ref}}{R_{\_r}} + \frac{T}{2R_{\_r}}\omega_{ref} + K_\omega(\omega_{ref} - \omega_{gyaw}) + K_r\alpha_y$$

FIG. 36
[Mathematical Formula 25]
$$\dot{\theta}_{L\_ref} = \frac{V_{ref}}{R_{\_l}} - \frac{T}{2R_{\_l}}\omega_{ref} - K_\omega(\omega_{ref} - \omega_{gyaw}) - K_r\alpha_y$$

FIG. 37
[Mathematical Formula 26]
$$\dot{\theta}_{R\_ref} = \frac{V_{ref}}{R_{\_r}} + \frac{T}{2R_{\_r}}\omega_{ref} + K_\omega(\omega_{ref} - \omega_{gyaw}) + K_{\omega i}\theta_i$$

FIG. 38
[Mathematical Formula 27]
$$\dot{\theta}_{L\_ref} = \frac{V_{ref}}{R_{\_l}} - \frac{T}{2R_{\_l}}\omega_{ref} - K_\omega(\omega_{ref} - \omega_{gyaw}) - K_{\omega i}\theta_i$$

PERSONAL VEHICLE CONTROL DEVICE

CROSS REFERENCE TO RELATED APPLICATIONS

This application is based on and claims priority under 35 U.S.C. §119 to Japanese Patent Application 2012-068750, filed on Mar. 26, 2012, and Japanese Patent Application 2013-021008, filed on Feb. 6, 2013, the entire contents of which are incorporated herein by reference.

TECHNICAL FIELD

This disclosure generally relates to a personal vehicle control device.

BACKGROUND DISCUSSION

A known personal vehicle, for example, a wheelchair includes a vehicle body having a seating portion on which a user is to be seated, a right-hand side wheel provided at the vehicle body and positioned at a right-hand side of the user seated on the seating portion, and a left-hand side wheel provided at the vehicle body and positioned at a left-hand side of the user seated on the seating portion. An operation portion to which a command value related to a vehicle body travel speed and a vehicle body turning angle is inputted is provided at the vehicle body of the personal vehicle.

A drawback is involved in a case where a roll angle relative to a roll axis of the vehicle body is assumed to be large because an inclination of a road surface has a steep angle when the personal vehicle travels straight in a direction to transverse on an inclined road surface (i.e., hereinafter referred to as cant travel). That is, despite the operation of the operation portion by the user to move the vehicle straight, a moving direction of the vehicle body may be unintentionally changed to a downward direction due to gravity on the road surface to deteriorate a straight traveling performance of the personal vehicle.

JP2010-193939A (hereinafter referred to as Patent reference 1) discloses a personal vehicle control device which reduces the foregoing drawback. The personal vehicle control device disclosed in Patent reference 1 includes a control portion for executing a control (here, the control is referred to as a fourth control law for an explanatory purpose) for ensuring a straight traveling performance of the personal vehicle by restraining an unintentional change in a moving direction of the vehicle body to a downward direction due to gravity as long as the operation portion is operated to move the personal vehicle straight even if the roll angle of the personal vehicle is large when the personal vehicle performs the cant travel.

FIG. 11 shows a flowchart of the fourth control law disclosed in Patent reference 1. The fourth control law is executed in the following manner. First, the control portion reads-in the roll angle of the vehicle body (inclination angle of the road surface) (Step S402). In a case where the roll angle of the vehicle body (inclination angle of the road surface) is equal to or greater than a predetermined level (i.e., YES at Step S404), the control portion obtains a turning angular velocity $\omega_{gyaw}$ of the personal vehicle relative to a yaw axis detected by a rate gyro provided at the personal vehicle (Step S406). Next, the control portion obtains a turning angular velocity command value $\omega_{ref}$ inputted from the operation portion (Step S408). Further, the control portion obtains a difference of the turning angular velocity command value $\omega_{ref}$ from the turning angular velocity $\omega_{gyaw}$ or a ratio of the turning angular velocity command value $\omega_{ref}$ relative to the turning angular velocity $\omega_{gyaw}$ (Step S410).

Further, in a case where the difference of the turning angular velocity command value $\omega_{ref}$ from the turning angular velocity $\omega_{gyaw}$ or the ratio of the turning angular velocity command value $\omega_{ref}$ relative to the turning angular velocity $\omega_{gyaw}$ is equal to or greater than a predetermined level (i.e., YES at Step S412), the control portion multiplies a turning angular velocity feedback gain to the difference of the turning angular velocity command value $\omega_{ref}$ from the turning angular velocity $\omega_{gyaw}$ or to the ratio of the turning angular velocity command value $\omega_{ref}$ relative to the turning angular velocity $\omega_{gyaw}$ to obtain a rotation angular velocity correction value of wheels at the right-hand side and the left-hand side. Based on the rotation angular velocity correction value, a rotation angular velocity command value $\dot{\theta}_{R\_ref}$ of the right-hand side wheel that the user commanded is corrected, and a rotation angular velocity command value $\dot{\theta}_{L\_ref}$ the left-hand side wheel that the user commanded is corrected (Step S414).

Further, the control portion corrects a drive torque $T_R$ of the right-hand side wheel on the basis of a difference between a rotation angular velocity $\dot{\theta}_R$ of the right-hand side wheel detected by a right-hand side wheel encoder and the rotation angular velocity command value $\dot{\theta}_{R\_ref}$ of the right-hand side wheel, and on the basis of a difference between a rotation angle $\theta_R$ of the right-hand side wheel detected by the right-hand side wheel encoder and an integral value of the rotation angular velocity command value $\dot{\theta}_{R\_ref}$. Further, the control portion corrects a drive torque $T_L$ of the left-hand side wheel on the basis of a difference between a rotation angular velocity $\dot{\theta}_L$ of the left-hand side wheel detected by a left-hand side wheel encoder and the rotation angular velocity command value $\dot{\theta}_{L\_ref}$ of the left-hand side wheel, and on the basis of a difference between a rotation angle $\theta_L$ of the left-hand side wheel detected by the left-hand side wheel encoder and an integral value of the rotation angular velocity command value $\dot{\theta}_{L\_ref}$ (Step S416). Accordingly, an unintentional change in a moving direction of the vehicle body of the personal vehicle, which is in cant travel, to a downward direction due to gravity is restrained.

According to the fourth control law of Patent reference 1, the rotation angular velocity correction value of the wheels at the right-hand side and left-hand side is obtained only based on the difference of the turning angular velocity command value from the actually measured turning angular velocity of the personal vehicle or the ratio of the turning angular velocity command value relative to the actually measured turning angular velocity. Accordingly, by repeatedly executing the fourth control law, the difference between the turning angular velocity command value and the actually measured turning angular velocity gradually approaches to zero (0), or the ratio of the turning angular velocity command value relative to the actually measured turning angular velocity gradually approaches to one (1), so that the unintentional change in a moving direction of the vehicle body of the personal vehicle to a downward direction due to gravity is gradually restrained. However, the fourth control law according to Patent reference 1 cannot sufficiently correct the unintentional change in a moving direction of the vehicle body to a downward direction due to gravity and a deviation of the turning angle that are once generated at the personal vehicle. Accordingly, in a case where the cant travel continues for a long period of time, the unintentional change in a moving direction of the vehicle body to a downward direction due to gravity of the personal vehicle and deviation of the turning angle are accumulated to deteriorate the straight traveling performance of the personal vehicle.

In the cant travel of the personal vehicle, when starting the cant travel, the unintentional change in a moving direction of the vehicle body of the personal vehicle to a downward direction due to gravity and the deviation of the turning angle are likely to occur. In those circumstances, as explained above, with the fourth control law according to Patent reference 1, once the unintentional change in a moving direction of the vehicle body to a downward direction due to gravity occurs and the deviation of the turning angle are generated because the correction is not sufficient, the unintentional change in a moving direction of the vehicle body to a downward direction due to gravity and the deviation are not corrected, that is, a state cannot be returned to the original state. Further, according to the control of the fourth control law which uses a feedback correction, a time is required to correct the generated unintentional change in a moving direction of the vehicle body to a downward direction due to gravity and to correct the generated deviation of the turning angle to return to the original state.

A need thus exists for a synchronous motor control device which is not susceptible to the drawback mentioned above.

SUMMARY

In light of the foregoing, the disclosure provides a personal vehicle control device for controlling a personal vehicle which includes a vehicle body including a seating portion which is configured so that a user is to be seated, a right-hand side wheel provided at the vehicle body and provided on a right side as the user seated on the seating portion faces a front of the vehicle, and a left-hand side wheel provided at the vehicle body and provided on a left side as the user seated on the seating portion faces the front of the vehicle, the personal vehicle control device includes an operation portion for inputting an original command value which includes a command value related to a turning angle of the vehicle body, an axis angle sensor for detecting a physical quantity related to a roll angle relative to a roll axis of the vehicle body and a physical quantity related to a turning angle relative to a yaw axis of the vehicle body, a right-hand side wheel sensor for detecting a physical quantity related to a rotation angular velocity of the right-hand side wheel, a left-hand side wheel sensor for detecting a physical quantity related to a rotation angular velocity of the left-hand side wheel, and a control portion. The control portion executes at least one of a first calculation law in which a roll angle is obtained on the basis of the physical quantity related to the roll angle detected by the axis angle sensor and in which an actual command value related to a rotation angular velocity for driving the right-hand side wheel and the left-hand side wheel is obtained on the basis of the obtained roll angle and the original command value, and a second calculation law in which an integrated value of a difference between the command value related to the turning angle inputted from the operation portion and the physical quantity related to the turning angle detected by the axis angle sensor with respect to time and/or an integrated value which is an integral of a ratio between the command value related to the turning angle inputted from the operation portion and the physical quantity related to the turning angle detected by the axis angle sensor with respect to time is obtained, and in which the actual command value is obtained so that the difference between the command value and the physical quantity is reduced and/or the ratio between the command value and the physical quantity is assumed to be close to one on the basis of the obtained integrated value and the original command value.

BRIEF DESCRIPTION OF THE DRAWINGS

The foregoing and additional features and characteristics of this disclosure will become more apparent from the following detailed description considered with the reference to the accompanying drawings, wherein:

FIG. 11 is a flowchart showing a fourth control law executed by a control portion provided at a known personal vehicle control device;

FIG. 12 shows a Mathematical Formula 1 according to the embodiment disclosed here;

FIG. 13 shows a Mathematical Formula 2 according to the embodiment disclosed here;

FIG. 14 shows a Mathematical Formula 3 according to the embodiment disclosed here;

FIG. 15 shows a Mathematical Formula 4 according to the embodiment disclosed here;

FIG. 16 shows a Mathematical Formula 5 according to the embodiment disclosed here;

FIG. 17 shows a Mathematical Formula 6 according to the embodiment disclosed here;

FIG. 18 shows a Mathematical Formula 7 according to the embodiment disclosed here;

FIG. 19 shows a Mathematical Formula 8 according to the embodiment disclosed here;

FIG. 20 shows a Mathematical Formula 9 according to the embodiment disclosed here;

FIG. 21 shows a Mathematical Formula 10 according to the embodiment disclosed here;

FIG. 22 shows a Mathematical Formula 11 according to the embodiment disclosed here;

FIG. 23 shows a Mathematical Formula 12 according to the embodiment disclosed here;

FIG. 24 shows a Mathematical Formula 13 according to the embodiment disclosed here;

FIG. 25 shows a Mathematical Formula 14 according to the embodiment disclosed here;

FIG. 26 shows a Mathematical Formula 15 according to the embodiment disclosed here;

FIG. 27 shows a Mathematical Formula 16 according to the embodiment disclosed here;

FIG. 28 shows a Mathematical Formula 17 according to the embodiment disclosed here;

FIG. 29 shows a Mathematical Formula 18 according to the embodiment disclosed here;

FIG. 30 shows a Mathematical Formula 19 according to the embodiment disclosed here;

FIG. 31 shows a Mathematical Formula 20 according to the embodiment disclosed here;

FIG. 32 shows a Mathematical Formula 21 according to the embodiment disclosed here;

FIG. 33 shows a Mathematical Formula 22 according to the embodiment disclosed here;

FIG. 34 shows a Mathematical Formula 23 according to the embodiment disclosed here;

FIG. 35 shows a Mathematical Formula 24 according to the embodiment disclosed here;

FIG. 36 shows a Mathematical Formula 25 according to the embodiment disclosed here;

FIG. 37 shows a Mathematical Formula 26 according to the embodiment disclosed here; and FIG. 38 shows a Mathematical Formula 27 according to the embodiment disclosed here.

DETAILED DESCRIPTION

One embodiment of a personal vehicle control device will be explained with reference to illustrations of drawing figures as follows.

Figure 1:
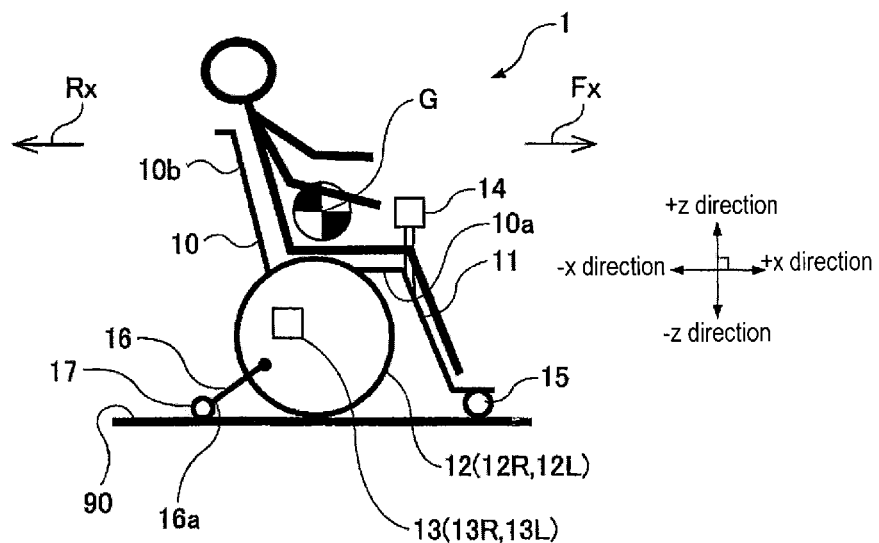
FIG. 1 is a schematic lateral view where a personal vehicle which is equipped with a personal vehicle control device travels straight on a flat road according to an embodiment disclosed here.
Figure 2:
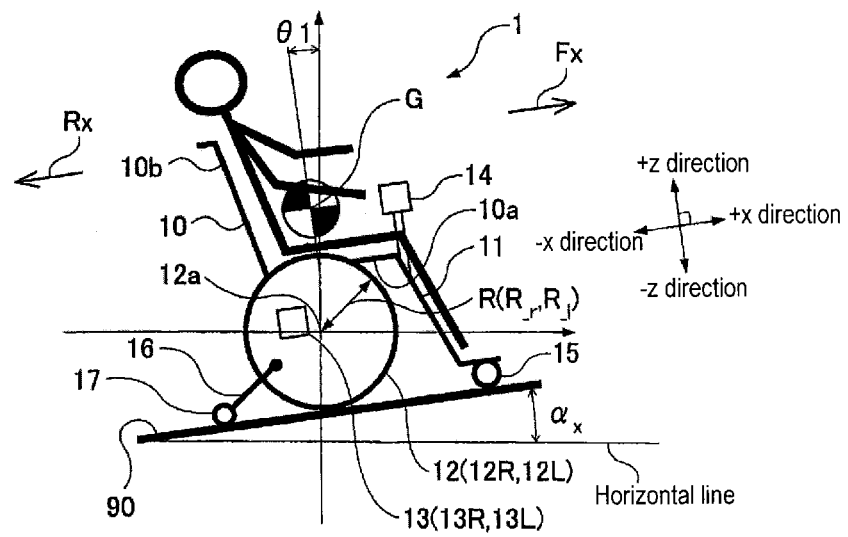
FIG. 2 is a schematic lateral view where the personal vehicle shown in FIG. 1 travels in a direction to ascend an inclined road surface.

According to the embodiment disclosed here, a personal vehicle 1 (hereinafter referred to as the vehicle 1) corresponds to an electric-powered wheelchair. FIG. 1 is a schematic lateral view where the vehicle 1 which is provided with the personal vehicle control device travels straight on a flat road. In FIG. 1, a forward direction (i.e., a direction Fx indicated with an arrow) corresponds to a direction that a face of a user who properly seats on the vehicle 1 faces, and to the direction that the vehicle 1 moves forward. A rearward direction (i.e., a direction Rx indicated with an arrow in FIG. 1) corresponds to an opposite direction from the direction that the face of the user who properly seats on the vehicle 1 faces, and to the direction that the vehicle 1 moves backward. Further, FIG. 2 is a schematic lateral view where the vehicle 1 shown in FIG. 1 travels in a direction to ascend a road surface 90 which is inclined.

The vehicle 1 includes a vehicle body 11, wheels 12R, 12L at right-hand side and left-hand side, wheel motors 13R, 13L at right-hand side and left-hand side, an operation portion 14, front wheels 15 at right-hand side and left-hand side, a support member 16, and rear wheels 17. The vehicle body 11 includes a seating portion 10 which is configured so that a user is to be seated. The wheels 12R, 12L at right-hand side and left-hand side are attached to the vehicle body 11 at the right-hand side and the left-hand side and serve as a rotatable driving wheel. The wheel motors 13R, 13L serve as a driving source for rotating the wheels 12. The operation portion 14 operates actuations of the wheel motors 13R, 13L. The front wheels 15 are rotatably attached to the vehicle body 11 and provided at forward position relative to the wheels 12. The support member 16 is provided at the vehicle body 11 to extend in a rearward of the wheels 12. The rear wheel 17 is rotatably provided at an end portion 16a of the support member 16. The seating portion 10 includes a seat portion 10a for supporting a lumbar of a user, and a seatback portion 10b for supporting a back of the user.

A rotation axis connecting rotation centers 12a (see FIG. 2) of the wheels 12R, 12L at right-hand side and left-hand side is positioned immediately below the center of gravity position G or in the vicinity of immediately below the center of gravity position G in a front-rear direction of the vehicle 1. The front wheels 15 correspond to caster wheels having smaller radius than radius of the wheels 12R, 12L at the right-hand side and left-hand side. According to the embodiment, the front wheels 15 are provided at right-hand side and left-hand side, respectively. However, alternatively, a single front wheel 15 may be provided at a center in a vehicle width direction. The rear wheels 17 are provided at right-hand side and left-hand side of the vehicle body 11, respectively. For example, an omni wheel which is movable in right, left directions may be applied as the rear wheel 17, however, types of the rear wheels 17 are not limited. Further, in an alternative structure, the rear wheel 17 may be positioned at a center in the vehicle width direction. Further, the number of the rear wheel 17 is not limited.

Figure 3:
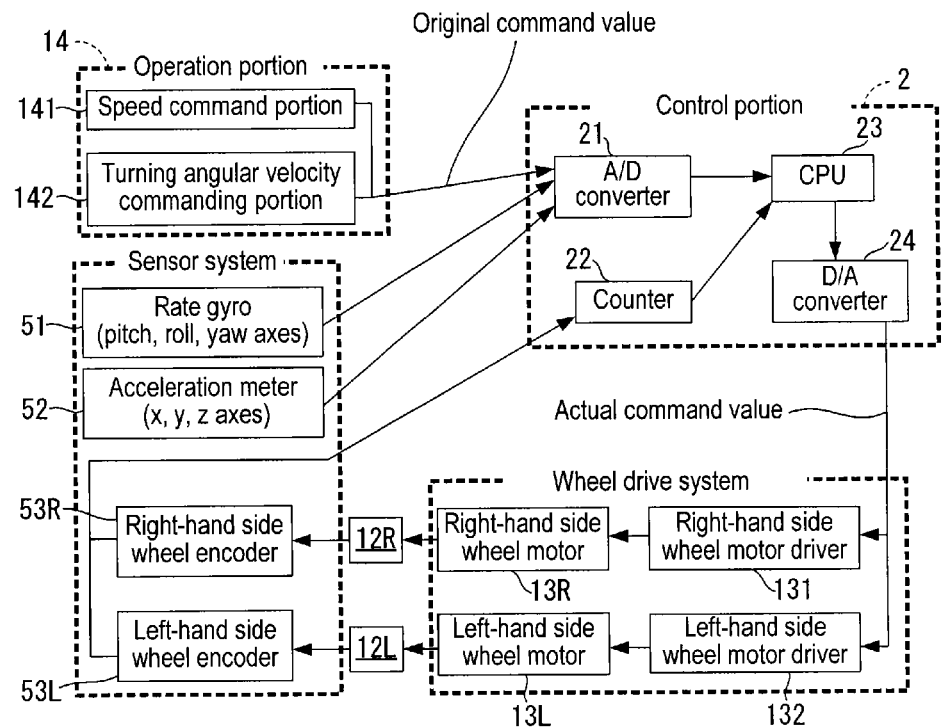
FIG. 3 is a block view explaining a construction of the personal vehicle control device according to the embodiment disclosed here.

FIG. 3 shows a block view for explaining a construction of the personal vehicle control device according to the embodiment. As shown in FIG. 3, the personal vehicle control device includes an operation portion 14, a sensor system, a control portion 2, and a wheel drive system.

The operation portion 14 is provided in the vicinity of the seating portion 10 so that it is easier for a user who is seated on the seating portion 10 to operate. The construction of the operation portion 14 is not limited to the foregoing construction, alternatively, an operation portion may be formed as a remote controller which is separated from the vehicle body 11. The operation portion 14 is a portion for inputting an original command value to a CPU 23 via an analog-to-digital converter (A/D converter) 21 provided in the control portion 2. For example, the operation portion 14 is formed with a joystick. The operation portion 14 includes a speed command portion 141 for ordering a vehicle travel speed, and a turning angular velocity commanding portion 142 for ordering a turning angular velocity. When leaning the operation portion 14 forward, a command for moving forward is outputted from the speed command portion 141. When leaning the operation portion 14 backward, a command for moving backward is outputted from the speed command portion 141. Then, in accordance with a leaning angle of the operation portion 14 in a front-rear direction, a straight running speed command value $V_{ref}$ increments. Further, when leaning the operation portion 14 rightward, a command for turning the vehicle body 11 to the right is outputted from the turning angular velocity command portion 142. When leaning the operation portion 14 leftward, a command for turning the vehicle body 11 to the left is outputted from the turning angular velocity command portion 142. Then, in accordance with the leaning angle of the operation portion 14 in rightward and leftward directions, a turning angular velocity command value $\omega_{ref}$ increments. In those circumstances, the operation portion 14 is not limited to the application of the joystick.

As shown in FIG. 3, the sensor system includes a rate gyroscope (i.e., serving as an axis angle sensor) 51 (hereinafter referred to as the rate gyro 51) provided at the vehicle body 11, an acceleration meter 52 (i.e., serving as an axis angle sensor), an encoder 53R for right-hand side wheel (i.e., serving as a right-hand side wheel sensor), and an encoder 53L for left-hand side wheel (i.e., serving as a left-hand side wheel sensor). Signals from each of the rate gyro 51 and the acceleration meter 52 are inputted to the CPU 23 via the analog-to-digital converter 21 in the control portion 2. Signals from each of the encoders 53R, 53L are inputted to the CPU 23 via a counter 22 provided in the control portion 2.

The rate gyro 51 is configured to detect an angular velocity in a pitch direction, an angular velocity in a roll direction, and an angular velocity in a yaw direction, each about the center of gravity position G of the vehicle body 11. The pitch direction corresponds to a direction of a rotational motion of the vehicle 1 about a center 12a in a radial direction of the wheel 12 with respect to a front-rear direction of the vehicle 1 (directions Fx, Rx in FIG. 2). Further, the rotational axis connecting the rotation centers 12a, 12a of the wheels 12R, 12L at the right-hand side and left-hand side corresponds to a pitch axis serving as a center of the motion in the pitch direction.

The acceleration meter 52 detects the acceleration in the front-rear direction (x direction) of the vehicle body 11 of the vehicle 1, the acceleration in a moving direction in the right-left direction (y direction) of the vehicle body 11, and the acceleration of the upward-downward direction (z direction) of the vehicle body 11. An output value of the acceleration meter 52 is affected by the acceleration of gravity g when the vehicle 1 inclines in the pitch direction. Thus, the acceleration meter 52 can detect a pitch angle θ1 (see FIG. 2) of the vehicle 1.

Accordingly, the rate gyro 51 and the acceleration meter 52 serve as a sensor for obtaining a road surface inclination angle $\alpha_x$ of the road surface 90 relative to the horizontal line in FIG. 2, that is, obtaining an inclination angle (i.e., pitch angle) θ1 of the vehicle body 11 in the pitch direction.

Figure 4:
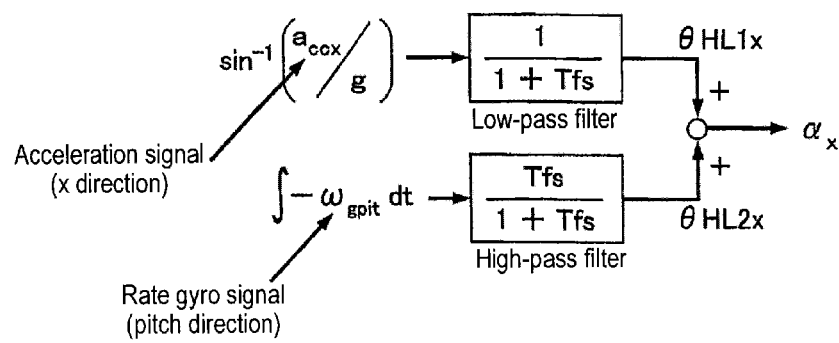
FIG. 4 is an explanatory view explaining an embodiment that a road surface inclination angle is computed by filtering physical quantities based on an acceleration signal and a rate gyro signal.

Detections of the road surface inclination angle $\alpha_x$ will be further explained. FIG. 4 is an explanatory view for computing the road surface inclination angle $\alpha_x$ by filtering (filter-processing) physical quantities based on an acceleration signal and a rate gyro signal. The acceleration meter 52 is applicable as a clinometer for detecting the road surface inclination angle $\alpha_x$ of the road surface 90 (i.e., the pitch angle of the vehicle body). In those circumstances, however, the acceleration meter 52 is affected by the acceleration in the forward-rearward direction of the vehicle body 11, which may become a cause of a measurement error of the road surface inclination angle $\alpha_x$. On the other hand, the road surface inclination angle $\alpha_x$ can be obtained by integrating the rate gyro signal obtained by the rate gyro 51 with the CPU 23. In those circumstances, however, a problem is arisen because of accumulated errors from drift due to the integration.

In order to overcome the foregoing drawback, as shown in FIG. 4, the control portion 2 obtains a value of $\sin^{-1}(a_{ccx}/g)$ on the basis of an output $a_{ccx}$ of the acceleration in the x direction of the vehicle 1 obtained by the acceleration meter 52, which serves as one of the sensors, while considering the acceleration of gravity g. Further, a value θHL1x from which high frequency noise is removed is obtained by filtering the value of $\sin^{-1}(a_{ccx}/g)$ by a low-pass filter (cut-off frequency fc). Further, the control portion 2 obtains an integrated value which is obtained by integrating a turning angular velocity $\omega_{gpit}$ in the pitch direction, which is an output value from the rate gyro 51 serving as the other one of the sensors, over time (with respect to time). Then, the control portion 2 obtains a value θHL2x from which low frequency noise is removed by filtering the integrated value by a high-pass filter (cut-off frequency fc).

The control portion 2 obtains the road surface inclination angle $\alpha_x$ by adding the value θHL1x and the value θHL2x. As described above, the value θHL1x based on the output value of the acceleration meter 52 is filtered by the low-pass filter. On the other hand, the value θHL2x based on the output value of the rate gyro 51 is filtered by the high-pass filter. That is, sensor characteristics of the acceleration meter 52 which has insufficient precision in high frequency region and the rate gyro 51 which has insufficient precision in low frequency region are compensated each other. Accordingly, the detection precision of the road surface inclination angle $\alpha_x$ is enhanced from the low frequency region through the high frequency region. In those circumstances, it is favorable to set the cut-off frequency fc of the low-pass filter to be the same with the cut-off frequency fc of the high-pass filter. However, the setting of the level of the cut-off frequency fc of the low-pass filter and the level of the cut-off frequency fc of the high-pass filter is not limited to the foregoing manner.

The encoder 53R for right-hand side wheel serves as a right-hand side wheel sensor for detecting a rotation angle $\theta_R$ of the right-hand side wheel 12R and serves as a speed sensor for the vehicle 1. The encoder 53L for left-hand side wheel serves as a left-hand side wheel sensor for detecting a rotation angle $\theta_L$ of the left-hand side wheel 12L and serves as a speed sensor for the vehicle 1. When each of the rotation angle $\theta_R$ of the right-hand side wheel 12R and the rotation angle $\theta_L$ of the left-hand side wheel 12L is differentiated over time by the CPU 23 (time derivative is computed), the rotation angular velocity $\dot{\theta}_R$ (theta $\text{dot}_R$) of the right-hand side wheel 12R and the rotation angular velocity $\dot{\theta}_L$ (theta $\text{dot}_L$) of the left-hand side wheel 12L are obtained. The dot indicates differential value (i.e., the dot indicates that the value is differentiated). That is, the encoders 53R, 53L of the right-hand side and left-hand side wheels serve as a rotation angular velocity sensor for detecting the angular velocity $\dot{\theta}_R$ and the rotation angular velocity $\dot{\theta}_L$.

The control portion 2 includes the analog-to-digital converter 21 having an interface function, the counter 22, either single CPU 23 or plural CPUs 23, and a digital-to-analogue converter (D/A converter) 24 having an interface function. The analogue-to-digital converter 21 converts a signal inputted from the rate gyro 51 and the acceleration meter 52 from analogue to digital and passes the converted signal on to the CPU 23. The counter 22 passes the signal inputted from the encoder 53R of the right-hand side wheel and the encoder 53L of the left-hand side wheel on to the CPU 23. The CPU 23 receives various signals from the analogue-to-digital converter 21 and the counter 22 and computes various mathematical operations to obtain actual command values necessary for controlling the traveling of the vehicle 1. The digital-to-analogue converter 24 converts the actual command value from the CPU 23 from digital to analogue which is to be outputted to a vehicle drive system.

The wheel drive system includes a right-hand side wheel motor 13R, a right-hand side wheel motor driver 131, a left-hand side wheel motor 13L, and a left-hand side wheel motor driver 132. An actual command value is inputted to the wheel motor drivers 131, 132 of the right-hand side and left-hand side from the CPU 23 via the digital-to-analogue converter 24. The right-hand side wheel motor 13R is controlled by the right-hand side wheel motor driver 131 to control the rotation drive of the right-hand side wheel 12R. The left-hand side wheel motor 13L is controlled by the left-hand side wheel motor driver 132 to control the rotation drive of the left-hand side wheel 12L.

When a user seated on the seating portion 10 operates the operation portion 14, in response to the operation of the operation portion 14, a straight running speed command value $V_{ref}$ and the turning angular velocity command value $\omega_{ref}$ of the vehicle 1 are outputted to the control portion 2. In the control portion 2, the straight running speed command value $V_{ref}$ and the turning angular velocity command value $W_{ref}$ are converted into a rotation angular velocity command value $\dot{\theta}_{R\_ref}$ of the right-hand side wheel 12R on the basis of Mathematical Formula 1 shown in FIG. 12, and are converted into a rotation angular velocity command value $\dot{\theta}_{L\_ref}$ of the left-hand side wheel 12L on the basis of Mathematical Formula 2 shown in FIG. 13. In the Mathematical Formula 1 and the Mathematical Formula 2, T stands for a distance (tread) between the right-hand side wheel 12R and the left-hand side wheel 12L. $R\_r$ stands for a radius of the right-hand side wheel 12R. $R\_l$ stands for a radius of the left-hand side wheel 12L.

According to Mathematical Formula 1 and Mathematical Formula 2 shown in FIGS. 12 and 13, the greater the straight running speed command value $V_{ref}$ is and the smaller the radius $R\_r$ and radius $R\_l$ of the right-hand side wheel 12R and left-hand side wheel 12L, respectively, are, the more the rotation angular velocity command value $\dot{\theta}_{R\_ref}$ of the right-hand side wheel 12R and the rotation angular velocity command value $\dot{\theta}_{L\_ref}$ of the left-hand side wheel 12L incremented. The rotation angular velocity command value $\dot{\theta}_{R\_ref}$ of the right-hand side wheel 12R and the rotation angular velocity command value $\dot{\theta}_{L\_ref}$ of the left-hand side wheel 12L are actual command values.

Further, the control portion 2 obtains a drive torque $T_R$ of the right-hand side wheel 12R on the basis of Mathematical Formula 3 shown in FIG. 14. Similarly, the control portion 2 obtains a drive torque $T_L$ of the left-hand side wheel 12L on the basis of Mathematical Formula 4 shown in FIG. 15.

In Mathematical Formula 3 and Mathematical Formula 4 shown in FIGS. 14 and 15, $K_{VR}$ stands for a rotation angular velocity feedback gain of the right-hand side wheel 12R, and $K_{VL}$ stands for a rotation angular velocity feedback gain of the left-hand side wheel 12L. Further, $K_{PR}$ stands for a rotation angle feedback gain of the right-hand side wheel 12R, and $K_{PL}$ stands for a rotation angle feedback gain of the left-hand side wheel 12L. $\theta_R$ stands for a rotation angle of the right-hand side wheel 12R, and $\theta_L$ stands for a rotation angle of the left-hand side wheel 12L. $\dot{\theta}_R$ stands for a rotation angular velocity obtained by differentiating the rotation angle of the right-hand side wheel 12R over time (derivative of the rotation angle of the right-hand side wheel 12R with respect to time). $\dot{\theta}_L$ stands for a rotation angular velocity obtained by differentiating the rotation angle of the left-hand side wheel 12L over time (derivative of the rotation angle of the left-hand side wheel 12L with respect to time). The obtained drive torques $T_R$, $T_L$ of the right-hand side and left-hand side are actual command values.

According to Mathematical Formula 3, the greater a difference is between the detected rotation angular velocity $\dot{\theta}_R$ of the right-hand side wheel 12R and the commanded rotation angular velocity command value $\dot{\theta}_{R\_ref}$ of the right-hand side wheel 12R, the greater the drive torque $T_R$ of the right-hand side wheel 12R is. Further, according to Mathematical Formula 4, the greater a difference is between the detected rotation angular velocity $\dot{\theta}_L$ of the left-hand side wheel 12L and the commanded rotation angular velocity command value $\dot{\theta}_{L\_ref}$ of the left-hand side wheel 12L, the greater the drive torque $T_L$ of the left-hand side wheel 12L is.

Based on the drive torque $T_R$ of the right-hand side wheel 12R and the drive torque $T_L$ of the left-hand side wheel 12L obtained in the foregoing manner, the control portion 2 realizes a control for forward and backward travel motion and a control for a turning motion of the vehicle 1. The vehicle 1 travels straight when the drive torque $T_R$ of the right-hand side wheel 12R and the drive torque $T_L$ of the left-hand side wheel 12L are substantially the same. In a case where the drive torque $T_R$ of the right-hand side wheel 12R is greater than the drive torque $T_L$ of the left-hand side wheel 12L, the vehicle 1 travels turning to the left. In a case where the drive torque $T_L$ of the left-hand side wheel 12L is greater than the drive torque $T_R$ of the right-hand side wheel 12R, the vehicle 1 travels turning to the right.

In those circumstances, the radius $R\_r$ and the radius $R\_l$ of the right-hand side wheel 12R and the left-hand side wheel 12L, respectively, are substantially the same length. Thus, Mathematical Formula 5 shown in FIG. 16 is established. Accordingly, a computing process may be simplified by substituting Mathematical Formula 5 for Mathematical Formula 1 and Mathematical Formula 2.

Figure 9:
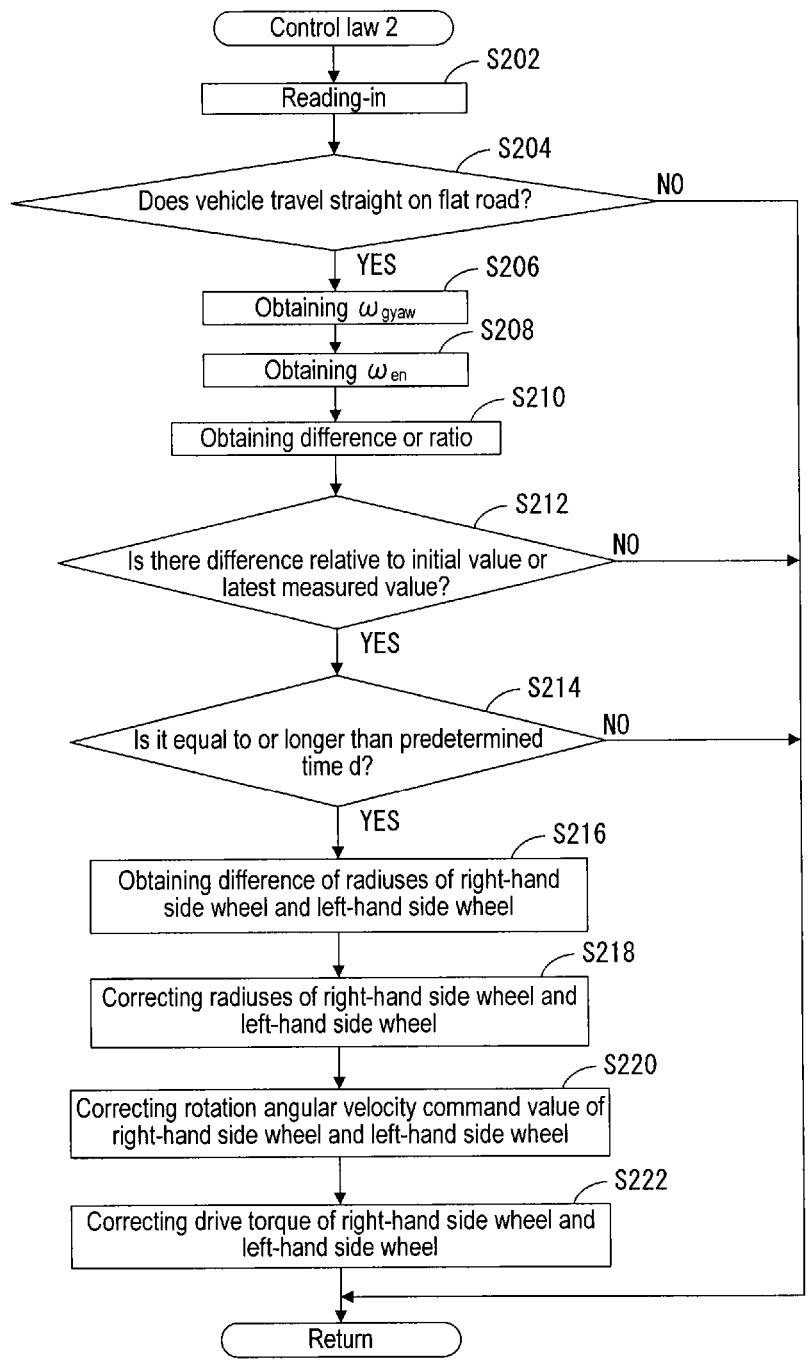
FIG. 9 is a flowchart showing a second control law executed by the control portion provided at the personal vehicle control device according to the embodiment disclosed here.
Figure 10:
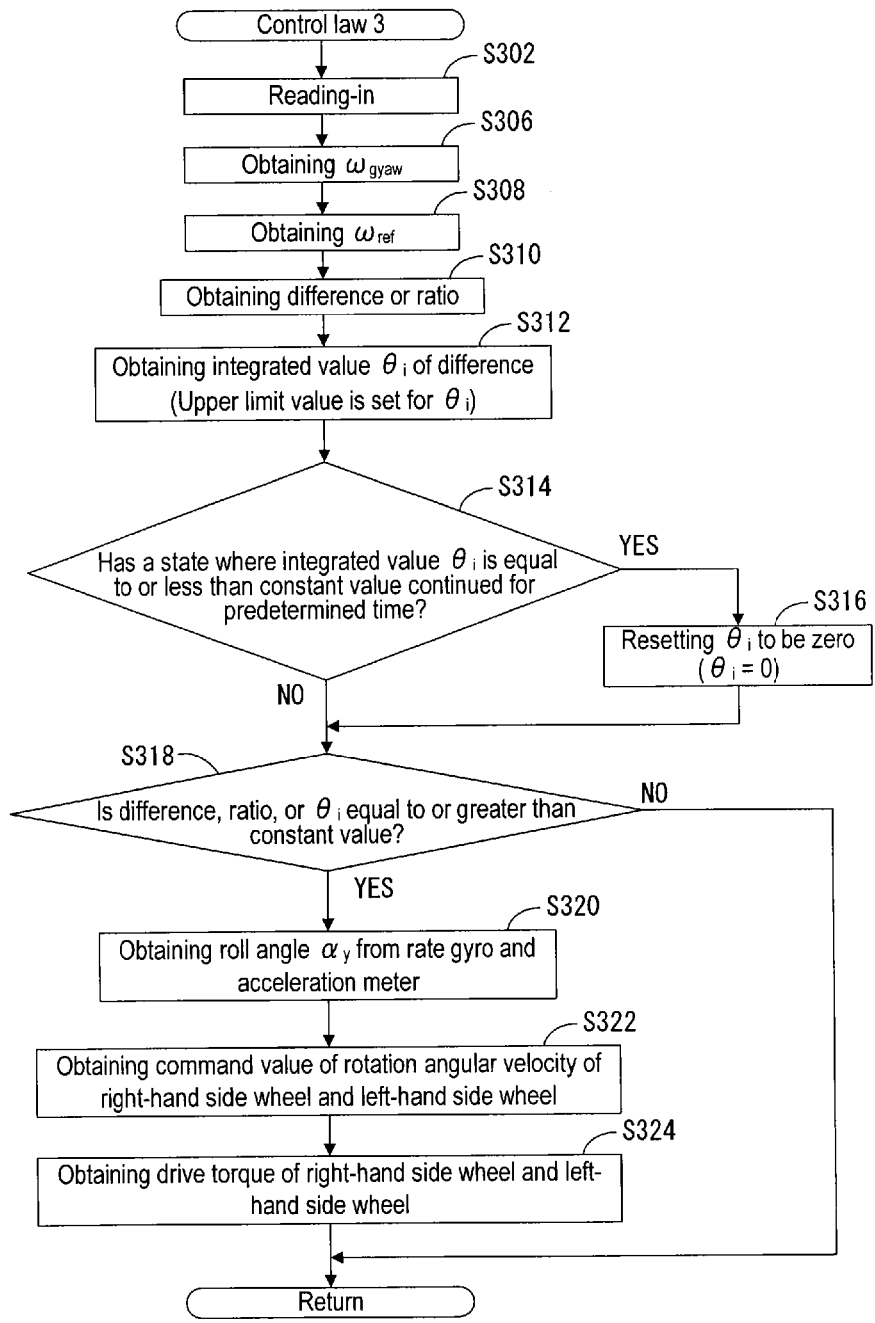
FIG. 10 is a flowchart showing the third control law executed by the control portion provided at the personal vehicle control device according to the embodiment disclosed here.

According to the embodiment, the control portion 2 executes a first control law (see FIG. 8), a second control law (see FIG. 9), and a third control law (see FIG. 10). The first control law corresponds to a control executed by the control portion for correcting an actual command value so that a vehicle body travel speed of the vehicle 1 does not exceed a maximum legal speed limit (i.e., serving as a maximum speed limit value). The second control law corresponds to a control executed by the control portion for correcting an actual command value in order to ensure a straight traveling performance against an unbalanced radius of the right-hand wheels 12R relative to the radius of the left-hand wheel 12L and distortion of a frame of the vehicle body 11. The third control law corresponds to a control executed by the control portion for enhancing a straight traveling performance by preventing an unintentional change in a moving direction of the vehicle body of the vehicle 1, which is in the cant travel, to a downward direction due to gravity.

The first control law according to the embodiment will be explained as follows. In normal state, the control portion 2 obtains the vehicle body travel speed of the vehicle 1 as follows. That is, the rotation angular velocity $\dot{\theta}_R$ of the right-hand side wheel 12R and the rotation angular velocity $\dot{\theta}_L$ of the left-hand side wheel 12L are obtained by differentiating the rotation angles $\dot{\theta}_R$, $\dot{\theta}_L$ detected by the encoders 53R, 53L of the wheels over time (derivative of the rotation angles $\theta_R$, $\theta_L$ detected by the encoders 53R, 53L of the wheels with respect to time). Accordingly, a vehicle body travel speed $V_{en}$ of the vehicle 1 is computed by the multiplication (as the product of) the rotation angular velocity $\dot{\theta}_R$ of the right-hand side wheel 12R and the radius $R\_r$ of the right-hand side wheel 12R, and by the multiplication of (as the product of) the rotation angular velocity $\dot{\theta}_L$ of the left-hand side wheel 12L and the radius $R\_l$ of the left-hand side wheel 12L.

In those circumstances, however, there is a possibility that a radius of a tire (i.e., radius of wheel) is increased by the replacement of tires with new tires or by an increase in air pressure of the tire. In those cases, an error may be generated at the vehicle body travel speed $V_{en}$ of the vehicle 1 computed on the basis of the encoders 53R, 53L of the wheels, and the actual vehicle body travel speed may exceed the maximum legal speed limit. According to the embodiment, the vehicle 1 corresponds to the electric-powered wheelchair, and the maximum legal speed limit of the electric-powered wheel chair is stipulated at 6 kilometers per hour (6 km/h). Thus, it is necessary to avoid the vehicle 1 from traveling exceeding the speed limit of 6 kilometers per hour.

In order to overcome the foregoing drawbacks, the personal vehicle control device according to the embodiment executes the first control law. Namely, the vehicle body travel speed is obtained by separate methods including a first method using the acceleration meter 52 and a second method using the encoders 53R, 53L of wheels, and by correcting radius of the wheel obtained by the second method after comparing the vehicle body travel speeds obtained by the first and second methods, a possibility that the vehicle 1 travels exceeding the maximum legal speed limit is eliminated. First, because time integral of the acceleration corresponds to speed, a first vehicle body travel speed $V_{acc}$ is obtained by integrating the acceleration $a_{ccx}$ in the x direction detected by the acceleration meter 52 over time (an integral of the acceleration $a_{ccx}$ in the x direction detected by the acceleration meter 52 with respect to time). In those circumstances, because the greater the road surface inclination angle $\alpha_x$ (see FIG. 2) of the road surface 90 on which the vehicle 1 travels is, the higher the possibility is that the acceleration meter 52 is influenced by the acceleration of gravity g, the influence is to be canceled.

That is, the signal of the acceleration $a_{ccx}$ in the advancing direction of the vehicle body 11 (i.e., in the x direction) outputted from the acceleration meter 52 includes the acceleration in accordance with the road surface inclination angle $\alpha_x$ of the road surface 90 because of the influence by the acceleration of gravity g. Thus, by canceling the component of acceleration influenced by the acceleration of gravity g and by performing an integration one time (single integration), the first vehicle body travel speed $V_{acc}$ can be obtained on the basis of the acceleration $a_{ccx}$ as shown in Mathematical Formula 6 shown in FIG. 17.

In Mathematical Formula 6 shown in FIG. 17, $a_{ccx}$ stands for the acceleration in the x-direction which is outputted from the acceleration meter 52. Further, the value computed by the filtering process explained with reference to FIG. 4 is applied as the road surface inclination angle $\alpha_x$. $V_{acc}$ corresponds to the first vehicle body travel speed obtained by the first method using the acceleration meter 52. In those circumstances, as explained above, because a problem that the error due to the integration may be accumulated may be unavoidable, the first vehicle body travel speed $V_{acc}$ is initialized to be zero (0) when the second vehicle body travel speed $V_{en}$ which is obtained on the basis of the encoders 53R, 53L of wheels is zero (0), that is, when the vehicle 1 is in a stopped state. Then, only for a predetermined time a from a timing that the acceleration of the vehicle 1 is recognized, the first vehicle body travel speed $V_{acc}$ is obtained on the basis of the acceleration $a_{ccx}$ outputted from the acceleration meter 52. According to the second method using the encoders 53R, 53L of the wheels, the second vehicle body travel speed $V_{en}$ is computed by the multiplication of (as the product of) each of the rotation angular velocity $\dot{\theta}_R$ of the right-hand side wheel 12R and the rotation angular velocity $\dot{\theta}_L$ of the left-hand side wheel 12L by an average value R of the radiuses of the vehicle wheels 12R, 12L of the right-hand side and left-hand side. Next, a ratio Z of the first vehicle body travel speed $V_{acc}$ relative to the second vehicle body travel speed $V_{en}$ (i.e., $V_{acc}/V_{en}$) is obtained, and Mathematical Formula 8 shown in FIG. 19 and Mathematical Formula 9 shown in FIG. 20 are compared while considering a threshold value β which is for detecting changes in radius of tire. In a case where the vehicle 1 travels straight, Mathematical Formula 7 shown in FIG. 18 is established under a condition that radiuses R of the right-hand side wheel and left-hand side wheel are equal.

In a case where there is a difference between the first vehicle body travel speed $V_{acc}$ and the second vehicle body travel speed $V_{en}$, a ratio Z is not one (1). In those circumstances, the ratio Z and a constant first value (1+β) are compared, and the ratio Z and a constant second value (1−β) are compared. Then, whether the ratio Z is greater than the first value (1+β) and whether the ratio Z is smaller than the second value (1−β) are determined. A determination sensitivity is adjusted by the threshold value β which is for detecting changes in radiuses $R_{\_r}$, $R_{\_l}$ of the wheels 12R, 12L.

In a case where a time during which Mathematical Formula 8 and Mathematical Formula 9 are satisfied exceeds a predetermined time b, the control portion 2 determines that the radius $R_{\_r}$ of the right-hand side wheel 12R and/or the radius $IR_{\_l}$ of the left-hand side wheel 12L are changed and that a straight running speed following performance (straight travel speed following performance) of the vehicle 1 is declined. In those circumstances, the control portion 2 obtains a renewed value $R_{\_new}$ of the radius of the wheel on the basis of Mathematical Formula 10 shown in FIG. 21 in order to renew the average value R of the radiuses $R_{\_r}$, $R_{\_l}$ of the wheels 12R, 12L.

Thus, the radius $R_{\_r}$ of the right-hand side wheel 12R and the radius $R_{\_l}$ of the left-hand side wheel 12L are corrected as the renewed value $R_{\_new}$ of the radius of the wheel. Then, the radius $R_{\_r}$ of the right-hand side wheel 12R and the radius $R_{\_l}$ of the left-hand side wheel 12L, which are corrected, are substituted for Mathematical Formula 1 and Mathematical Formula 2, and the rotation angular velocity command value $\dot{\theta}_{R\_ref}$ of the right-hand side wheel 12R and the rotation angular velocity command value $\dot{\theta}_{L\_ref}$ of the left-hand side wheel 12L are corrected. Accordingly, the drive torque $T_R$ of the right-hand side wheel 12R is corrected on the basis of Mathematical Formula 3, and the drive torque $T_L$ of the left-hand side wheel 12L is corrected on the basis of Mathematical Formula 4. On the basis of the drive torque $T_R$ of the right-hand side wheel 12R corrected in the foregoing manner and the drive torque $T_L$ of the left-hand side wheel 12L corrected in the foregoing manner, a travel control, or running control of the vehicle 1 is achieved (travel of the vehicle 1 is controlled). Thus, by the correction of the actual command value, the vehicle 1 is controlled so that the vehicle body travel speed does not exceed the maximum legal speed limit.

Figure 8:
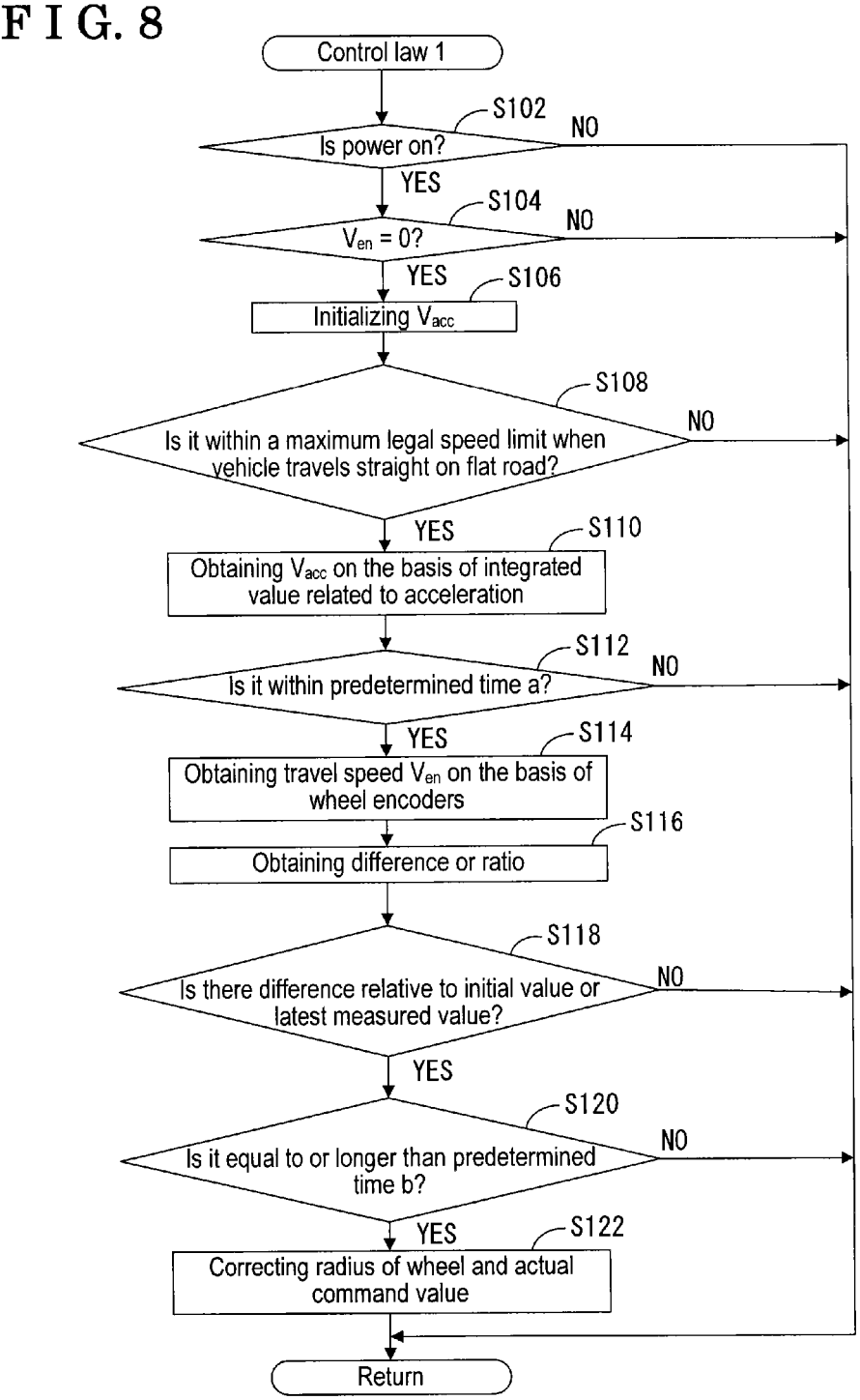
FIG. 8 is a flowchart showing a first control law executed by a control portion provided at the personal vehicle control device according to the embodiment disclosed here.

FIG. 8 shows a flowchart for the first control law explained above. As shown in FIG. 8, when a power of the vehicle 1 is turned on (i.e., YES at Step S102), the control portion 2 determines whether the second vehicle body travel speed $V_{en}$, which is computed on the basis of the vehicle wheel encoders 53R, 53L, is zero (0) (Step S104). When the second vehicle body travel speed $V_{en}$ is zero (0) (i.e., YES at Step S104), the control portion 2 initializes the first vehicle body travel speed $V_{acc}$ obtained by integrating the outputted value of the acceleration meter 52 (Step S106).

Further, the control portion 2 determines whether the vehicle 1 is traveling (is in motion) within the maximum legal speed limit when the vehicle 1 travels straight on a flat road (Step S108). When the vehicle 1 travels straight on a flat road within the maximum legal speed limit (i.e., YES at Step S108), the control portion 2 obtains the first vehicle body travel speed $V_{acc}$ using Mathematical Formula 6, that is, using an integrated value related to acceleration (Step S110). Next, the control portion 2 determines whether an elapsed time from the initialization is equal to or within a predetermined time a (Step S112). In a case where the elapsed time is within the predetermined time a (i.e., YES at Step S112), the control portion 2 obtains the second vehicle body travel speed $V_{en}$ on the basis of the outputted value of the vehicle wheel encoders 53R, 53L (Step S114). Then, the ratio Z of the first vehicle body travel speed $V_{acc}$ relative to the second vehicle body travel speed $V_{en}$ is obtained (Step S116). In those circumstances, alternatively, in place of the ratio Z, a difference D may be obtained by subtracting the second vehicle body travel speed $V_{en}$ from the first vehicle body travels speed $V_{acc}$ (i.e., $D=V_{acc}-V_{en}$).

Then, the control portion 2 determines whether the ratio Z or the difference D differs from the initial value or the latest measured value (threshold value) (Step S118). In a case where there is a difference between the ratio Z or the difference D and the initial value or the latest measured value (threshold value) (i.e., YES at Step S118), it is determined whether the state where there is the difference between the ratio Z or the difference D and the initial value or the latest measured value (threshold value) continues for equal to or longer than a predetermined time b (Step S120). In a case where the state where there is the difference between the ratio Z or the difference D and the initial value or the latest measured value (threshold value) continues for equal to or longer than the predetermined time b (i.e., YES at Step S120), the control portion 2 determines that the radius $R_{\_r}$ of the right-hand side wheel 12R and/or the radius $R_{\_l}$ of the left-hand side wheel 12L is changed and the vehicle body travel speed of the vehicle 1 is changed. Then, the control portion 20 corrects the actual command value and the radiuses $R_{\_r}$, $R_{\_l}$ of the wheels so that the actual vehicle body travel speed of the vehicle 1 does not exceed the maximum legal speed limits (Step S122). Particularly, the corrections are performed based on Mathematical Formula 10, Mathematical Formula 1, Mathematical Formula 2, and Mathematical Formula 4. In a case where the condition is not satisfied at each of Step S102, Step S104, Step S108, Step S112, Step S118, and Step S120 (i.e., NO at each of Steps), the flow is ended, or canceled immediately.

The second control law will be explained as follows. In some cases, the radius $R_{\_r}$ of the right-hand side wheel 12R and the radius $R_{\_l}$ of the left-hand side wheel 12L of the vehicle 1 are unbalanced and/or a frame of the vehicle body 11 is distorted, or skewed (i.e., imbalanced), for example, because of fluctuations of level of the air pressure of the tires constructing the right-hand side wheel 12R and the left-hand side wheel 12L, and abrasions of the tire. In a case where the radius $R_{\_r}$ of the right-hand side wheel 12R and the radius $R_{\_l}$ of the left-hand side wheel 12L of the vehicle 1 are unbalanced and/or a frame of the vehicle body 11 is distorted, or skewed, even when the operation portion 14 is operated so that the vehicle body 11 travels straight on the flat road, the straight traveling performance of the vehicle body 11 may be deteriorated.

Thus, in order to overcome the foregoing drawbacks, the personal vehicle control device according to the embodiment executes the second control law. The control portion 2 executes the second control law 2 when it is determined that the vehicle 1 travels straight on a flat road on the basis of signals from the rate gyro 51. The control portion 2, first, obtains a first turning angular velocity $\omega_{gyaw}$ corresponding to a physical quantity related to a turning of the vehicle body 11 relative to a yaw axis detected by the rate gyro 51 and a second turning angular velocity $\omega_{en}$ corresponding to a physical quantity related to a turning of the vehicle body 11 obtained based on the wheel encoders 53R, 53L. The control portion 2 estimates that the radius $R_{\_r}$ of the right-hand side wheel 12R and the radius $R_{\_l}$ of the left-hand side wheel 12L are unbalanced and/or the frame of the vehicle body 11 is imbalanced in a case where a difference between the first turning angular velocity $\omega_{gyaw}$ and the second turning angular velocity $\omega_{en}$ or a ratio of the first turning angular velocity $\omega_{gyaw}$ relative to the second turning angular velocity $\omega_{en}$ (i.e., $\omega_{gyaw}/\omega_{en}$) is equal to or more than a predetermined value and in a case where a state that the difference between the first turning angular velocity $\omega_{gyaw}$ and the second turning angular velocity $\omega_{en}$ or the ratio of the first turning angular velocity $\omega_{gyaw}$ relative to the second turning angular velocity $\omega_{en}$ is equal to or more than the predetermined value continues for a equal to or longer than a predetermined time d. Accordingly, the control portion 2 corrects the actual command value, and the straight traveling performance of the vehicle body 11 on a flat road is ensured.

The second control law will be further explained as follows. The control portion 2 obtains the absolute value $D_{abs}$ of the difference between the first turning angular velocity $\omega_{gyaw}$ obtained from the rate gyro 51 and the second turning angular velocity $\omega_{en}$ computed based on the information from the vehicle wheel encoders 53R, 53L (i.e., $|\omega_{gyaw}-\omega_{en}|$). The control portion 2 monitors a magnitude correlation between the absolute value $D_{abs}$ of the difference and a threshold value $\beta_\omega$ based on Mathematical Formula 11 shown in FIG. 22. The threshold value $\beta_\omega$ is set to a level for detecting an imbalance of the radiuses of the right-hand side wheel 12R and the left-hand side wheel 12L. A determination sensitivity is adjustable on the basis of the threshold value $\beta_\omega$.

In a case where the time which satisfies Mathematical Formula 11 continues for equal to or longer than the predetermined time d, the control portion 2 determines that the radiuses of the wheels are unbalanced or the frame is distorted, or skewed (i.e., imbalanced). In those circumstances, in a case where the time which satisfies Mathematical Formula 11 continues for equal to or longer than the predetermined time d because of the unbalanced radiuses of the wheels, the greater the absolute value $D_{abs}$ of the difference of the first turning angular velocity $\omega_{gyaw}$ and the second turning angular velocity $\omega_{en}$ is, the greater a difference between the radius $R_{\_r}$ of the right-hand side wheel 12R and the radius $R_{\_l}$ of the left-hand side wheel 12L is assumed to be, which deteriorates the straight traveling performance of the vehicle 1 on a flat road surface. A difference $R_{\_diff\_new}$ between the radius $R_{\_r}$ of the right-hand side wheel 12R and the radius $R_{\_l}$ of the left-hand side wheel 12L is obtained on the basis of Mathematical Formula 12 shown in FIG. 23.

Further, using values calculated in Mathematical Formula 10 and Mathematical Formula 12, the radius $R_{\_r}$ of the right-hand side wheel 12R is corrected to be renewed as shown in Mathematical Formula 13 shown in FIG. 24. Further, the radius $R_{\_l}$ of the left-hand side wheel 12L is corrected to be renewed as shown in Mathematical Formula 14 shown in FIG. 25.

Then, by substituting the radius $R_{\_r}$ of the right-hand side wheel 12R and the radius $R_{\_l}$ of the left-hand side wheel 12L for Mathematical Formula 1 and Mathematical Formula 2, the rotation angular velocity command value $\dot{\theta}_{R\_ref}$ of the right-hand side wheel 12R and the rotation angular velocity command value $\dot{\theta}_{L\_ref}$ of the left-hand side wheel 12L are corrected. Further, based on Mathematical Formula 3 and Mathematical Formula 4, in accordance with the radius $R_{\_r}$ of the right-hand side wheel 12R and the radius $R_{\_l}$ of the left-hand side wheel 12L, the drive torque $T_R$ of the right-hand side wheel 12R and the drive torque $T_L$ of the left-hand side wheel 12L are corrected. Accordingly, when the vehicle 1 travels straight on a flat road, the vehicle body travel speed of the vehicle 1 and the straight traveling performance of the vehicle 1 can be ensured.

FIG. 9 shows a flowchart for the second control law explained above. As shown in FIG. 9, the control portion 2 reads-in a signal of an original command value of the operation portion 14 (Step S202). The control portion 2 determines whether the vehicle 1 outputs a flat-road-straight traveling command (i.e., whether the straight travel of the vehicle 1 on the flat road is intended) (Step S204). In a case where the vehicle 1 outputs the flat-road-straight traveling command (i.e., YES at Step S204), the control portion 2 obtains the first turning angular velocity $\omega_{gyaw}$ from an outputted value of the rate gyro 51 (Step S206), and obtains the second turning angular velocity $\omega_{en}$ from an outputted value of the vehicle wheel encoders 53R, 53L (Step S208). Further, the control portion 2 obtains the absolute value $D_{abs}$ of the difference of the first turning angular velocity $\omega_{gyaw}$ and the second turning angular velocity $\omega_{en}$ (Step S210). In those circumstances, what is obtained is not limited to the absolute value $D_{abs}$ of the difference of the first turning angular velocity $\omega_{gyaw}$ and the second turning angular velocity $\omega_{en}$. That is, alternatively, a difference D2 of the first turning angular velocity $\omega_{gyaw}$ and the second turning angular velocity $\omega_{en}$ (i.e., either positive or negative), or a ratio Z2 obtained by dividing the first turning angular velocity $\omega_{gyaw}$ by the second turning angular velocity $\omega_{en}$ may be obtained.

Then, the control portion 2 determines whether the absolute value $D_{abs}$ of the difference (alternatively, the difference D2 or the ratio Z2) differs from the initial value or the latest measured value (threshold value) (Step S212). When there is a difference between the absolute value $D_{abs}$ of the difference (alternatively, the difference D2 or the ratio Z2) and the initial value or the latest measured value (threshold value) (i.e., YES at Step S212), the control portion 2 determines whether a time during which the difference exists continues for equal to or longer than the determined time d (Step S214). In a case where the time during which the difference exists continues for equal to or longer than the determined time d (i.e., YES at Step S214), the control portion 2 determines that the radius $R_{\_r}$ of the right-hand side wheel 12R and the radius $R_{\_l}$ of the left-hand side wheel 12L are unbalanced. In those circumstances, the control portion 2 obtains the difference $R_{\_diff\_new}$ between the radius $R_{\_r}$ of the right-hand side wheel 12R and the radius $R_{\_l}$ of the left-hand side wheel 12L (Step S216).

The radius $R_{\_r}$ of the right-hand side wheel 12R is corrected to be renewed as shown in Mathematical Formula 13, and the radius $R_{\_l}$ of the left-hand side wheel 12L is corrected to be renewed as shown in Mathematical Formula 14 (Step S218). Then, the corrected radiuses $R_{\_r}$, $R_{\_l}$ are substituted for Mathematical Formula 1 and Mathematical Formula 2 to correct the rotation angular velocity command value $\dot{\theta}_{R\_ref}$ of the right-hand side wheel 12R and the rotation angular velocity command value $\dot{\theta}_{L\_ref}$ of the left-hand side wheel 12L (Step S220). Further, based on Mathematical Formula 3 and Mathematical Formula 4, the drive torque $T_R$ of the right-hand side wheel 12R and the drive torque $T_L$ of the left-hand side wheel 12L are corrected (Step S222). In those circumstances, in a case where the condition is not satisfied at each of Steps, that is, at Step S204, Step S212, and Step S214 (i.e., NO at each of Steps), the execution of the flowchart is ended, or canceled immediately.

Figure 5:
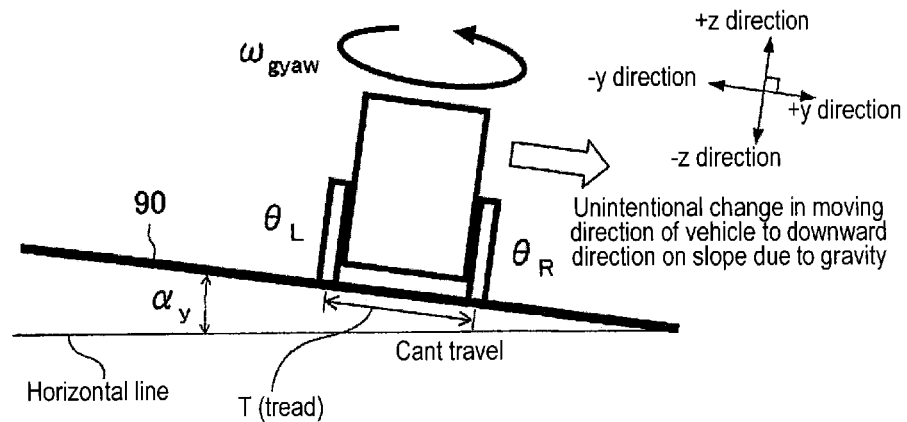
FIG. 5 is a schematic rear view of the personal vehicle shown in FIG. 1 which is in a cant travel.

The third control law according to the embodiment will be explained as follows. The third control law prevents an unintentional change in a moving direction of the vehicle body of the vehicle 1, which is in a cant travel, to a downward direction due to gravity shown in FIG. 5 to enhance the straight traveling performance. FIG. 5 is a rearview schematically showing a state where the personal vehicle shown in FIG. 1 is in a cant travel. As shown in FIG. 5, in a case where an inclination angle $\alpha_y$ of the road surface 90 (i.e., a roll angle $\alpha_y$ of the vehicle body) is large, a moment around a yaw axis may be generated when the vehicle 1 is in the cant travel. In those circumstances, the vehicle 1 may move, or turn to change direction because of the gravity in a downward direction on a slope of the road surface 90 (see wide white arrow in FIG. 5) irrespective of an input of a straight travel command in a direction to transverse, or cross the road surface 90 by an operation of the operation portion 14 (e.g., joy stick) by a user who is seated in the vehicle 1.

In order to overcome the foregoing drawback, the personal vehicle control device according to the embodiment executes the third control law. The third control law includes a first calculation law, a second calculation law, and a third calculation law. First, the second calculation law and the third calculation law (to the middle of the second and third calculation laws) will be explained. The control portion 2 obtains the first turning angular velocity $\omega_{gyaw}$ relative to the yaw axis of the vehicle 1 detected by the rate gyro 51. Then, the control portion 2 obtains the turning angular velocity command value $\omega_{ref}$ inputted from the operation portion 14. The control portion 2 further obtains a difference between the turning angular velocity command value $\omega_{ref}$ and the turning angular velocity $\omega_{gyaw}$ (i.e., $\omega_{ref}-\omega_{gyaw}$). The greater the difference (i.e., $\omega_{ref}-\omega_{gyaw}$) is, the more a possibility that the vehicle 1 in cant travel moves, or turns to change direction in a downward direction on the road surface 90 increases. The difference (i.e., $\omega_{ref}-\omega_{gyaw}$) is applied in the third calculation law. Further, based on Mathematical Formula 15 shown in FIG. 26, the control portion 2 obtains an integrated value $\theta_i$ which is an integral of the difference (i.e., $\omega_{ref}-\omega_{gyaw}$) with respect to time. The integrated value $\theta_i$ corresponds to a difference between a command value of a turning angle of the vehicle body 11 and an actually measured value. Thus, the greater the integrated value $\theta_i$ is, the greater a distance that the vehicle moves downward on the slope of the vehicle 1 in a cant travel on the road surface 90 is. The integrated value $\theta_i$ is applied in the second calculation law.

Figure 6:
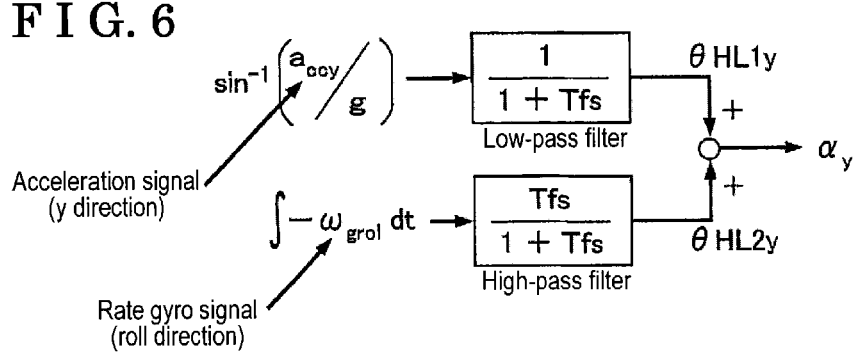
FIG. 6 is an explanatory view explaining an embodiment that a roll angle of a vehicle body is computed by filtering physical quantities based on an acceleration signal and a rate gyro signal.

The first calculation law (i.e., to the middle of the first calculation law) will be explained as follows. The control portion 2 obtains the roll angle $\alpha_y$ of the vehicle body (vehicle 1) and the inclination angle $\alpha_y$ of the road surface 90 with high precision in an embodiment shown in FIG. 6, which is similar to a detection manner of the road surface inclination angle $\alpha_x$ explained in FIG. 4. FIG. 6 is an explanatory view for computing the roll angle $\alpha_y$ of the vehicle body (vehicle 1) and the inclination angle $\alpha_y$ of the road surface 90 by filtering (filter processing) physical quantities based on an acceleration signal and a rate gyro signal. As shown in FIG. 6, the control portion 2 obtains a value of $\sin^{-1}(a_{ccy}/g)$ on the basis of an output $a_{ccy}$ of the acceleration in y-direction of the vehicle 1 obtained from the acceleration meter 52 which is one of the sensors while considering the acceleration of gravity g. Further, the value of $\sin^{-1}(a_{ccy}/g)$ is filtered by a low-pass filter (cut-off frequency fc) to obtain a value $\theta HL1y$ from which a noise with high frequency region is removed. Further, the control portion 2 obtains an integrated value which is an integral of a turning angular velocity $\omega_{grol}$ in a roll direction with respect to time. The turning angular velocity $\omega_{grol}$ in a roll direction is an output value of the rate gyro 51 serving as the other of the sensors. Then, the integrated value which is the integral of a turning angular velocity $\omega_{grol}$ in a roll direction with respect to time is filtered by a high-pass filter (cut-off frequency fc) to obtain a value $\theta HL2y$ from which a noise with low frequency region is removed. Thus, the control portion 2 obtains the roll angle $\alpha_y$ by adding the value $\theta HL1y$ and the value $\theta HL2y$.

Hereinafter, an arithmetic processing of the first to third calculation laws from the middle to the end, which is in common among the first to third calculation laws, will be explained. The control portion 2 obtains the rotation angular velocity command value $\dot{\theta}_{R\_ref}$ of the right-hand side wheel 12R on the basis of Mathematical Formula 16 shown in FIG. 27 while considering the difference between the turning angular velocity command value $\omega_{ref}$ and the turning angular velocity $\omega_{gyaw}$ (i.e., $\omega_{ref}-\omega_{gyaw}$), the integrated value $\theta_i$ of the difference (i.e., $\omega_{ref}-\omega_{gyaw}$), and the roll angle $\alpha_y$. Further, the control portion 2 obtains the rotation angular velocity command value $\dot{\theta}_{L\_ref}$ of the left-hand side wheel 12L on the basis of Mathematical Formula 17 shown in FIG. 28 while considering the difference between the turning angular velocity command value $\omega_{ref}$ and the turning angular velocity $\omega_{gyaw}$ (i.e., $\omega_{ref}-\omega_{gyaw}$), the integrated value $\theta_i$ of the difference (i.e., $\omega_{ref}-\omega_{gyaw}$), and the roll angle $\alpha_y$. The computation of the actual command value is achieved by a computation based on the turning angular velocity command value $\omega_{ref}$ and the straight running speed command value $V_{ref}$ that are original command values, and a correction computation by a feedforward control and a feedback control.

The right-hand sides of equations of Mathematical Formula 16 and Mathematical Formula 17 include five terms. The first term of the right-hand sides of the equations of Mathematical Formula 16 and Mathematical Formula 17 is a term in which the straight running speed command value $V_{ref}$ is divided by the radius of the wheel $R\_r$, $R\_l$. The second term of the right-hand sides of the equations of Mathematical Formula 16 and Mathematical Formula 17 is a term in which the distance (tread) between the right-hand side wheel 12R and the left-hand side wheel 12L is divided by the radius of the wheel $R\_r$, $R\_l$ multiplied by two (2), which is multiplied by the turning angular velocity command value $\omega_{ref}$. That is, the first term and the second term are obtained based on original command values. Further, the third term of the right-hand sides of the equations of Mathematical Formula 16 and Mathematical Formula 17 is a term obtained by multiplying a turning angular velocity feedback gain $K_\omega$ by the difference between the turning angular velocity command value $\omega_{ref}$ and the turning angular velocity $\omega_{gyaw}$ (i.e., $\omega_{ref}-\omega_{gyaw}$). In other words, the third term of the right-hand sides of the equations of Mathematical Formula 16 and Mathematical Formula 17 is a term for a feedback control using a proportional. The fourth term obtained by multiplying the integrated value $\theta_i$ by a turning angle feedback gain $K_{\omega i}$ is a term associated with the second calculation law, that is, fourth term is a term for the feedback control in which an integral term is used. The fifth term of the right-hand sides of the equations of Mathematical Formula 16 and Mathematical Formula 17 is a term obtained by multiplying the roll angle $\alpha_y$ by a roll angle feedforward gain $K_r$. In other words, the fifth term is a term which is related to the first calculation law and for performing a correction swiftly by a feedforward control, for example, when starting a cant travel.

The first term of the right-hand sides of the equations of Mathematical Formula 16 and Mathematical Formula 17 is positive (i.e., expressed with a plus sign). The absolute value of the second, third, fourth, and fifth terms of the right-hand sides of the equations of Mathematical Formula 16 and the absolute value of the second, third, fourth, and fifth terms of the right-hand sides of the equations of Mathematical Formula 17 are equal to each other, respectively. The second, third, fourth, and fifth terms of the right-hand sides of the equations of Mathematical Formula 16 are positive (i.e., expressed with plus signs). The second, third, fourth, and fifth terms of the right-hand sides of the equations of Mathematical Formula 17 are negative (i.e., expressed with minus signs). In those circumstances, alternatively, instead of including the difference of the turning angular velocity command value $\omega_{ref}$ from the turning angular velocity $\omega_{gyaw}$ (i.e., $\omega_{ref}-\omega_{gyaw}$), the third terms of the right-hand sides of the equations of Mathematical Formula 16 and Mathematical Formula 17 may be replaced with a term which includes a ratio of the turning angular velocity command value $\omega_{ref}$ relative to the turning angular velocity $\omega_{gyaw}$ (i.e., $\omega_{ref}/\omega_{gyaw}$), or further alternatively, with a term including both of the difference of the turning angular velocity command value $\omega_{ref}$ from the turning angular velocity $\omega_{gyaw}$ (i.e., $\omega_{ref}-\omega_{gyaw}$) and the ratio of the turning angular velocity command value $\omega_{ref}$ relative to the turning angular velocity $\omega_{gyaw}$ (i.e., $\omega_{ref}/\omega_{gyaw}$).

By substituting the obtained rotation angular velocity command value $\dot{\theta}_{R\_ref}$ and the obtained rotation angular velocity command value $\dot{\theta}_{L\_ref}$ for Mathematical Formula 3 and Mathematical Formula 4, respectively, the drive torque $T_R$ of the right-hand side wheel 12R and the drive torque $T_L$ of the left-hand side wheel 12L are obtained. Accordingly, the unintentional change in a moving direction of the vehicle body to a downward direction due to gravity of the vehicle 1 which is in a cant travel on the road surface 90 is restrained, and the straight traveling performance of the vehicle 1 is ensured.

According to Mathematical Formula 16 and Mathematical Formula 17, the greater the difference between the turning angular velocity command value $\omega_{ref}$ and the turning angular velocity $\omega_{gyaw}$ (i.e., $\omega_{ref}-\omega_{gyaw}$) is, the more a difference increases between the rotation angular velocity command value $\dot{\theta}_{R\_ref}$ of the right-hand side wheel 12R and the rotation angular velocity command value $\dot{\theta}_{L\_ref}$ of the left-hand side wheel 12L. In addition to that, the smaller the difference between the turning angular velocity command value $\omega_{ref}$ and the turning angular velocity $\omega_{gyaw}$ (i.e., $\omega_{ref}-\omega_{gyaw}$) is, the more a difference decreases between the rotation angular velocity command value $\dot{\theta}_{R\_ref}$ of the right-hand side wheel 12R and the rotation angular velocity command value $\dot{\theta}_{L\_ref}$ of the left-hand side wheel 12L. Thus, it is favorable to reduce the difference between the turning angular velocity command value $\omega_{ref}$ and the turning angular velocity $\omega_{gyaw}$ (i.e., $\omega_{ref}-\omega_{gyaw}$) during the cant travel. More particularly, it is favorable to reduce the difference between the turning angular velocity command value $\omega_{ref}$ and the turning angular velocity $\omega_{gyaw}$ (i.e., $\omega_{ref}-\omega_{gyaw}$) to be zero (0) during the cant travel.

FIG. 10 shows a flowchart of the third control law explained above. As shown in FIG. 10, the control portion 2 reads-in the original command value from the operation portion 14, and reads-in outputted values of each of sensors 51, 52, 53R, and 53L (Step S302). Then, the control portion 2 obtains the turning angular velocity $\omega_{gyaw}$ of the vehicle 1 relative to the yaw axis detected by the rate gyro 51 (Step S306). Then, the control portion 2 obtains the turning angular velocity command value $\omega_{ref}$ among the original command value (Step S308). Further, the control portion 2 obtains the difference between the turning angular velocity command value $\omega_{ref}$ and the turning angular velocity $\omega_{gyaw}$ (i.e., $\omega_{ref}-\omega_{gyaw}$) or the ratio of the turning angular velocity command value $\omega_{ref}$ relative to the turning angular velocity $\omega_{gyaw}$ (i.e., $\omega_{ref}-\omega_{gyaw}$) (Step S310).

Further, the control portion 2 obtains the integrated value $\theta_i$ of the difference between the turning angular velocity command value $\omega_{ref}$ and the turning angular velocity $\omega_{gyaw}$ (i.e., $\omega_{ref}-\omega_{gyaw}$) using Mathematical Formula 13 (Step S312). In those circumstances, by setting an upper limit value of the integrated value $\theta_i$, it is prevented that the actual command value is suddenly, or abruptly corrected on the basis of the integrated value $\theta_i$ and the actual command value is smoothly changed. In a case where the time period during which the integrated value $\theta_i$ is equal to or less than a constant value (predetermined value) continues for a predetermined time (i.e., YES at Step S314), it is determined that a state of cant travel is changed, and the integrated value $\theta_i$ is reset to be zero (0) (Step S316), thereafter the transaction advances to Step S318. On the other hand, in a case where the integrated value $\theta_i$ exceeds the constant value (predetermined value) or in a case where the time during which the integrated value $\theta_i$ is equal to or less than the constant value does not continue for the predetermined time (i.e., NO at Step S314), the transaction advances to Step S318.

Next, in a case where the difference between the turning angular velocity command value $\omega_{ref}$ and the turning angular velocity $\omega_{gyaw}$ (i.e., $\omega_{ref} - \omega_{gyaw}$), the ratio of the turning angular velocity command value $\omega_{ref}$ relative to the turning angular velocity $\omega_{gyaw}$ (i.e., $\omega_{ref}/\omega_{gyaw}$), or the integrated value $\theta_i$ is equal to or greater than the constant value (predetermined value) (i.e., YES at Step S318), the control portion 2 obtains the roll angle $\alpha_y$ with high precision, or high accuracy on the basis of a turning angular velocity $\omega_{grol}$ outputted from the rate gyro 51 and an acceleration $a_{accy}$ in y-direction outputted from the acceleration meter 52 (Step S320). Further, the control portion 2 obtains the first to fifth terms of the right-hand sides of the equations of Mathematical Formula 16 and Mathematical Formula 17 to obtain the rotation angular velocity command value $\dot{\theta}_{R\_ref}$ of the right-hand side wheel 12R and the rotation angular velocity command value $\dot{\theta}_{L\_ref}$ of the left-hand side wheel 12L of the left-hand sides of the equations of Mathematical Formula 16 and Mathematical Formula 17 (Step S322). Further, the control portion 2 obtains the drive torques $T_R$, $T_L$ at the right-hand side and left-hand side wheels on the basis of Mathematical Formula 3 and Mathematical Formula 4 (Step S324).

First to fifth application examples in which the embodiment of the disclosure is applied will be explained as follows. It is not necessary to execute all of the first to third calculation laws in the third control law. In each of application examples, a part of the first to third calculation laws in the third control law is omitted, and accordingly, the computation process of the second portion 2 can be simplified.

According to the first application example, only the feedforward control of the first calculation law is executed in the third control law. That is, the third term and the fourth term of the right-hand sides of the equations of Mathematical Formula 16 and Mathematical Formula 17 are omitted. The rotation angular velocity command value $\dot{\theta}_{R\_ref}$ of the right-hand side wheel 12R and the rotation angular velocity command value $\dot{\theta}_{L\_ref}$ of the left-hand side wheel 12L are obtained by Mathematical Formula 18 and Mathematical Formula 19 shown in FIGS. 29 and 30.

According to the second application example, only the feedback control which uses the integral term of the second calculation law of the third control law is executed. That is, the third and fifth terms of the right-hand sides of the equations of Mathematical Formula 16 and Mathematical Formula 17 are omitted. Accordingly, the rotation angular velocity command value $\dot{\theta}_{R\_ref}$ of the right-hand side wheel 12R and the rotation angular velocity command value $\dot{\theta}_{L\_ref}$ of the left-hand side wheel 12L are obtained by Mathematical Formula 20 and Mathematical Formula 21 shown in FIGS. 31 and 32.

According to the third application example, the feedforward control of the first calculation law and the feedback control which uses the integral term of the second calculation law are executed in the third control law. That is, the third term of the right-hand sides of the equations of Mathematical Formula 16 and Mathematical Formula 17 are omitted. Accordingly, the rotation angular velocity command value $\dot{\theta}_{R\_ref}$ of the right-hand side wheel 12R and the rotation angular velocity command value $\dot{\theta}_{L\_ref}$ of the left-hand side wheel 12L are obtained by Mathematical Formula 22 and Mathematical Formula 23 shown in FIGS. 33 and 34.

According to the fourth application example, the feedforward control of the first calculation law and the feedback control which uses the proportional of the third calculation law are executed in the third control law. That is, the fourth term of the right-hand sides of the equations of Mathematical Formula 16 and Mathematical Formula 17 are omitted. Accordingly, the rotation angular velocity command value $\dot{\theta}_{R\_ref}$ of the right-hand side wheel 12R and the rotation angular velocity command value $\dot{\theta}_{L\_ref}$ of the left-hand side wheel 12L are obtained by Mathematical Formula 24 and Mathematical Formula 25 shown in FIGS. 35, 36.

According to the fifth application example, the feedback control which uses the integral term of the second calculation law and the feedback control which uses the proportional of the third calculation law are executed in the third control law. That is, the fifth term of the right-hand sides of the equations of Mathematical Formula 16 and Mathematical Formula 17 are omitted. Accordingly, the rotation angular velocity command value $\dot{\theta}_{R\_ref}$ of the right-hand side wheel 12R and the rotation angular velocity command value $\dot{\theta}_{L\_ref}$ of the left-hand side wheel 12L are obtained by Mathematical Formula 26 and Mathematical Formula 27 shown in FIGS. 37, 38.

Figure 7:
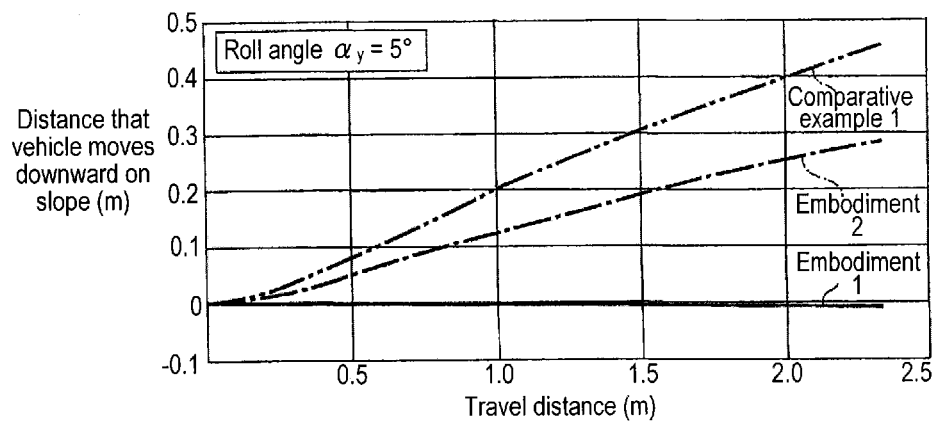
FIG. 7 is a graph explaining effects of a third control law executed by the personal vehicle control device, the graph showing a relationship between a travel distance when the personal vehicle is in the cant travel and a distance that the personal vehicle moves downward on a slope according to the embodiment disclosed here.

According to the embodiment described below, advantage and effects of the third control law which the control portion 2 executes will be explained as follows. FIG. 7 is a graph for explaining effects and advantages of the third control law executed by the personal vehicle control device of the embodiment, which shows a relationship between a running distance (travel distance) and a distance that the vehicle moves downwardly on the slope along the inclination surface when the personal vehicle 1 is in cant travel. According to the embodiment, the cant travel of the vehicle 1 is performed by outputting a straight traveling command from the operation portion 14 (e.g., joystick) to the control portion 2 of the vehicle 1 under a condition that the vehicle 1 travels on the road surface 90 whose inclination angle $\alpha_y$ is five degrees (i.e., the roll angle $\alpha_y$ of the vehicle body is five degree) (see FIG. 5). That is, the operation portion 14 (joystick) is leaned only in the forward direction without moving in a right-left direction and the constant straight running speed command value $V_{ref}$ is maintained during the cant travel.

A graph of an embodiment 1 indicated with a solid line in FIG. 7 shows a result of the cant travel of the vehicle 1 in a case where the personal vehicle 1 is controlled by the third control law which includes the first, second, and third calculation laws of the embodiment. Referring to the graph of the embodiment 1 indicated with a solid line in FIG. 7, the unintentional change in a moving direction of the vehicle body to a downward direction due to gravity barely occurs at a point at which the vehicle 1 travels to 2.3 meters. A graph of an embodiment 2 indicated with a single-dotted chain line in FIG. 7 shows a result of the cant travel of the vehicle 1 in a case where the personal vehicle 1 is controlled by the third control law which includes the second calculation law and the third calculation law. Referring to the graph of the second embodiment indicated with a single dotted chain line in FIG.

7, an unintentional motion of the vehicle in a downward direction on the slope by the unintentional change in a moving direction of the vehicle body to a downward direction due to gravity by an amount slightly less than 0.3 meters occurs at a point at which the vehicle 1 travels to 2.3 meters.

On the other hand, a graph of a comparative example 1 indicated with a double-dotted chain line in FIG. 7 shows a result of a cant travel of the vehicle 1 in a case where a control for restraining unintentional change in a moving direction of the vehicle body to a downward direction due to gravity is not performed, where the third to fifth terms of Mathematical Formula 16 and Mathematical Formula 17 are omitted. According to the graph of the comparative example 1 indicated with the double-dotted chain line in FIG. 7, an unintentional motion of the vehicle in a downward direction on the slope by the unintentional change in a moving direction of the vehicle body to a downward direction due to gravity by an amount about 0.45 meters occurs at a point at which the vehicle 1 travels to 2.3 meters.

By comparing the embodiment 1 and the comparative example 1, it is verified that unintentional change in a moving direction of the vehicle body to a downward direction due to gravity of the vehicle 1 which is in a cant travel on the road surface 90 is favorably restrained by executing the third control law which includes the first to third calculation laws. Further, by comparing the embodiment 2 and the comparative example 1, it is verified that unintentional change in a moving direction of the vehicle body to a downward direction due to gravity of the vehicle 1 which is in a cant travel is restrained by executing the third control law which includes the second and third calculation laws (i.e., the unintentional change is restrained even if the first calculation law is omitted).

According to the construction of the embodiment and the application examples, because the actual command value can be corrected in response to changes in the radius $R_{\_r}$ of the right-hand side wheel 12R and/or the radius $R_{\_l}$ of the left-hand side wheel of the left-hand side wheel 12L by the first control law, the vehicle 1 is controlled so that the vehicle body travel speed does not exceed the maximum legal speed limit. Further, because the actual command value can be corrected in response to an occurrence of an imbalance of the radius $R_{\_r}$ of the right-hand side wheel 12R and the radius $R_{\_l}$ of the left-hand side wheel of the left-hand side wheel 12L, the vehicle body travel speed is controlled and the straight traveling performance of the vehicle 1 can be ensured when the vehicle travels straight on a flat road.

Further, by the third control law, by executing at least one of the first and second calculation laws, and further by applying the third calculation law as necessity arises, the actual command value for driving the right-hand side wheel and the left-hand side wheel can be obtained appropriately. Thus, when the vehicle 1 is in the cant travel, the unintentional change in a moving direction of the vehicle body to a downward direction due to gravity of the vehicle body 11 on the road surface 90 is restrained to allow the cant travel of the vehicle 1 while ensuring the straight traveling performance of the vehicle body 11. More particularly, by the feedback control using the proportional based on the difference between the turning angular velocity command value $\omega_{ref}$ and the turning angular velocity $\omega_{gyaw}$ (i.e., $\omega_{ref}-\omega_{gyaw}$), a turning motion of the vehicle body 11 during the cant travel is gradually restrained. Further, by the feedback control using the integral term based on the integrated value $\theta_i$ of the difference between the turning angular velocity command value $\omega_{ref}$ and the turning angular velocity $\omega_{gyaw}$ (i.e., $\omega_{ref}-\omega_{gyaw}$), a deviation of a turning angle which once occurred to the vehicle 1 can be fixed. Thus, even when the cant travel continues for a long period of time, the unintentional change in a moving direction of the vehicle body to a downward direction due to gravity of the vehicle 1 and deviations of the turning angle are not accumulated, whereby the straight traveling performance of the vehicle 1 is ensured. Further, by the feedforward control based on the roll angle $\alpha_y$, the unintentional change in a moving direction of the vehicle body to a downward direction due to gravity of the vehicle body 11 of the road surface 90 can be corrected swiftly, and the straight traveling performance, for example, when the vehicle starts the cant travel can be enhanced.

The personal vehicle control device according to the disclosure is not limited to the embodiment and the first to fifth application examples, and may be varied.

According to the construction of the personal vehicle control device of the embodiment, for example, the control portion 2 controls all of the first control law, the second control law, and the third control law. However, alternatively, a construction in which the third control law only is executed, a construction in which the first control law and the third control law are executed, or a construction in which the second control law and the third control law are executed, may be applied.

According to the construction of the embodiments, when the personal vehicle is in the cant travel in a direction to cross, or transverse the inclined road surface, even if the roll angle of the personal vehicle is large, unintentional change in a moving direction of the vehicle body to a downward direction due to gravity of the vehicle body is corrected swiftly as long as the operation portion is operated with an intention to drive the vehicle straight, and the straight traveling performance is ensured.

According to the construction of the embodiment, the personal vehicle control device for controlling a personal vehicle which includes the vehicle body (11) including the seating portion (10) which is configured so that a user is to be seated, the right-hand side wheel (12R) provided at the vehicle body and provided on a right side as the user seated on the seating portion (10) faces a front of the vehicle, and the left-hand side wheel (12L) provided at the vehicle body (11) and provided on a left side as the user seated on the seating portion (10) faces the front of the vehicle, the personal vehicle control device includes the operation portion (14) for inputting an original command value which includes a command value related to a turning angle of the vehicle body (10), the axis angle sensor (rate gyroscope 51, acceleration meter 52) for detecting a physical quantity related to a roll angle relative to a roll axis of the vehicle body and a physical quantity related to a turning angle relative to a yaw axis of the vehicle body, the right-hand side wheel sensor (encoder 53R) for detecting a physical quantity related to a rotation angular velocity of the right-hand side wheel, the left-hand side wheel sensor (encoder 53L) for detecting a physical quantity related to a rotation angular velocity of the left-hand side wheel, and the control portion (2). The control portion (2) executes at least one of the first calculation law in which a roll angle is obtained on the basis of the physical quantity related to the roll angle detected by the axis angle sensor and in which an actual command value related to a rotation angular velocity for driving the right-hand side wheel and the left-hand side wheel is obtained on the basis of the obtained roll angle and the original command value, and the second calculation law in which an integrated value of a difference between the command value related to the turning angle inputted from the operation portion and the physical quantity related to the turning angle detected by the axis angle sensor with respect to time and/or an integrated value which is an integral of a ratio between the command value related to the turning angle inputted from the operation portion and the physical quantity related to the turning angle detected by the axis angle sensor with respect to time is obtained (an integral of a ratio of a command value related to the turning angle inputted from the operation portion relative to the physical quantity related to the turning angle detected by the axis angle sensor with respect to time is obtained), and in which the actual command value is obtained so that the difference between the command value and the physical quantity is reduced and/or the ratio between the command value and the physical quantity (the ratio of the command value relative to the physical quantity) is assumed to be close to one on the basis of the obtained integrated value and the original command value.

According to the construction of the embodiment, the rate gyro 51 and the acceleration meter 52 may be applied as the axis angle sensor. According to the rate gyro 51, angular velocity of the vehicle body in a pitch direction, angular velocity of the vehicle body in a roll direction, and angular velocity of the vehicle body in a yaw direction are detected. Further, the right-hand side wheel sensor (encoder 53R) detects the physical quantity related to a rotation velocity of the right-hand side wheel of the vehicle body (e.g., rotation angular velocity per se, or rotation angle). The left-hand side wheel sensor (encoder 53L) detects the physical quantity related to the rotation angular velocity of the left-hand side wheel of the vehicle body. For example, the encoders 53R, 53L are applied as the right-hand side wheel sensor and the left-hand side wheel sensor, respectively. The rotation angle sensor, for example, an encoder detects the rotation angle of the right-hand side wheel and the left-hand side wheel. Then, the vehicle travel speed of the personal vehicle 1 is obtained by multiplying the rotation angular velocity obtained by a time rate of change (a derivative with respect to time) of the rotation angle by the radius $R_{\_r}$ of the right-hand side wheel 12R and by multiplying the rotation angular velocity obtained by a time rate of change (a derivative with respect to time) of the rotation angle by the radius $R_{\_l}$ of the left-hand side wheel.

Generally, in a case where an original command value is inputted from the operation portion to the control portion, for example, by a user, for performing a cant travel of a personal vehicle, provided that a roll angle of the vehicle body is large, even if the operation portion is operated with an intention to drive the vehicle straight, the vehicle body may moves, or turns to change direction in a downward direction unintentionally because of the gravity. In this case, a straight traveling performance of the personal vehicle is deteriorated.

According to the construction of the embodiment of the disclosure, the control portion executes at least one of the first calculation law and the second calculation law. In the first calculation law, the control portion obtains a roll angle of the vehicle body on the basis of the physical quantity related to the roll angle detected by the axis angle sensor (rate gyro 51 and the acceleration meter 52), and obtains the actual command value related to the rotation angular velocity for driving the right-hand side wheel and the left-hand side wheel on the basis of the obtained roll angle and the original command value (feedforward control). In the second calculation law, the control portion obtains the integrated value which is the integral of the difference between the command value related to the turning angle inputted from the operation portion (e.g., a command value of a turning angular velocity or a command value of a turning angle) and the physical quantity related to the turning angle detected by the axis angle sensor (rate gyro 51 and the acceleration meter 52) (e.g., a physical quantity of a turning angular velocity or a physical quantity of a turning angle) with respect to time and/or the integrated value which is the integral of the ratio between the command value related to the turning angle inputted from the operation portion (e.g., a command value of a turning angular velocity or a command value of a turning angle) and the physical quantity related to the turning angle detected by the axis angle sensor (rate gyro 51 and the acceleration meter 52) (e.g., a physical quantity of a turning angular velocity or a physical quantity of a turning angle) with respect to time. Then, the control portion obtains the actual command value so that the difference is reduced and/or the ratio is assumed to be close to one (1) on the basis of the obtained integrated value and the original command value (i.e., feedback control which uses an integral term). For example, the integrated value which is an integral of a difference of turning angular velocities with respect to time corresponds to a difference between a command value of a turning angle of the vehicle body and an actually measured value.

Thus, by performing at least one of the feedforward control of the first calculation law and the feedback control which uses the integral term of the second calculation law by the control portion 2, the actual command value for driving the right-hand side wheel and the left-hand side wheel is obtained. Accordingly, in a case where the personal vehicle 1 is in a cant travel, the unintentional change in a moving direction of the vehicle body to a downward direction due to gravity is restrained to allow the vehicle continues cant travel in a state where the straight traveling performance is ensured. Further, because the unintentional change in a moving direction of the vehicle body to a downward direction due to gravity is corrected swiftly, the straight traveling performance is enhanced even if an unintentional change in a moving direction of the vehicle body to a downward direction due to gravity occurs when the vehicle starts cant traveling.

According to the construction of the embodiment, the control portion (2) estimates whether an unintentional change in a moving direction of the vehicle body, which is in a cant travel, to a downward direction due to gravity occurs on the basis of the difference between the command value and the physical quantity and/or the ratio between the command value and the physical quantity (ratio of the command value relative to the physical quantity), and executes the third calculation law for obtaining the actual command value so that the difference is assumed to be smaller and/or the ratio is assumed to be closer to one on the basis of the difference between the command value and the physical quantity and/or the ratio between the command value and the physical quantity (the ratio of the command value relative to the physical quantity), and the original command value.

In the third calculation law, the control portion obtains the command value related to the turning angle and the physical quantity related to the turning angle. Then, the control portion estimates whether the vehicle body moves, or turns to change direction in a downward direction unintentionally during the cant travel on the basis of the difference between the command value and the physical quantity and/or the ratio between the command value and the physical quantity (the ratio of the command value relative to the physical quantity). In a case where the difference is relatively large and/or the ratio is relatively away from one (1), the personal vehicle is likely to move, or turn to change direction in a downward direction unintentionally. In order to overcome the foregoing drawback, the control portion obtains the actual command value for driving the right-hand side wheel and the left-hand side wheel so that the difference is reduced and/or the ratio is assumed to be close to one (1) (i.e., feedback control which uses proportional). According to the construction of the embodiment, because the control portion applies the third calculation law in addition to the application of at least one of the first calculation law and the second calculation law, even when the cant travel of the vehicle continues for a long period of time, unintentional change in a moving direction of the vehicle body to a downward direction due to gravity of the personal vehicle and deviations of turning angle are not accumulated, and the straight traveling performance of the vehicle is further favorably ensured.

According to the construction of the embodiment, in a state where it is determined that the vehicle body (11) travels straight on a flat road, the control portion obtains the physical quantity related to the turning angle detected by the axis angle sensor and the physical quantity related to the turning angle of the vehicle body obtained on the basis of the right-hand side wheel sensor and the left-hand side wheel sensor, the control portion (2) estimates that the radius $R_{\_r}$ of the right-hand side wheel (12R) and the radius of the left-hand side wheel (12L) are unbalanced or the frame of the vehicle body is imbalanced when a difference of the physical quantity related to the turning angle detected by the axis angle sensor and the physical quantity related to the turning angle of the vehicle body obtained on the basis of the right-hand side wheel sensor and the left-hand side wheel sensor or a ratio obtained by dividing a greater one of the physical quantity related to the turning angle detected by the axis angle sensor and the physical quantity related to the turning angle of the vehicle body obtained on the basis of the right-hand side wheel sensor and the left-hand side wheel sensor by a smaller one of the physical quantity related to the turning angle detected by the axis angle sensor and the physical quantity related to the turning angle of the vehicle body obtained on the basis of the right-hand side wheel sensor and the left-hand side wheel sensor is equal to or greater than a predetermined value and when a state that the difference or the ratio is equal to or greater than the predetermined value continues for a predetermined time, and the control portion corrects the actual command value.

In those circumstances, the ratio which is obtained by dividing the greater one of the physical quantities by the smaller one of the physical quantities is assumed to be equal to or greater than one (1). It means that a difference between the greater one of the physical quantities and the smaller one of the physical quantities is greater when the ratio which is obtained by dividing the greater one of the physical quantities by the smaller one of the physical quantities is equal to or greater than the predetermined value. In a case where the right-hand side wheel and the left-hand side wheel are unbalanced because of the fluctuation of the radius $R_{\_r}$ of the right-hand side wheel 12R and/or the left-hand side wheel 12L by a fluctuation of a level of the air pressure of the tire, which structures the right-hand side wheel and the left-hand side wheel, and/or the fluctuation of the radius of wheels because of the abrasion of the tire, or in a case where the frame of the vehicle body is distorted, or skewed (i.e., imbalanced), the difference between the greater one of the physical quantities and the smaller one of the physical quantities or the ratio of the greater one of the physical quantities relative to the smaller one of the physical quantities can be equal to or greater than the predetermined value. In those circumstances, even when the vehicle body travels straight on a flat road, the straight traveling performance of the vehicle body may be deteriorated.

According to the construction of the disclosure, when the vehicle body travels straight on the flat road, the control portion obtains the physical quantity related to the turning angle detected by the axis angle sensor (rate gyro 51, the acceleration meter 52) (e.g., turning angular velocity) and the physical quantity related to the turning angle of the vehicle body obtained on the basis of the right-hand side wheel sensor (encoder 53R for right-hand side wheel) and the left-hand side wheel sensor (encoder 53L for left-hand side wheel) (e.g., turning angular velocity). When the difference between the physical quantity related to the turning angle detected by the axis angle sensor and the physical quantity related to the turning angle of the vehicle body obtained on the basis of the right-hand side wheel sensor or the ratio obtained by dividing the greater one of physical quantities by the smaller one of physical quantities is equal to or greater than the predetermined value and the state where the difference between the physical quantity related to the turning angle detected by the axis angle sensor and the physical quantity related to the turning angle of the vehicle body obtained on the basis of the right-hand side wheel sensor or the ratio obtained by dividing the greater one of physical quantities by the smaller one of physical quantities is equal to or greater than the predetermined value continues for equal to or longer than the predetermined time period, the control portion 2 estimates that the radius $R_{\_r}$ of the right-hand side wheel 12R and the radius $R_{\_L}$ of the left-hand side wheel 12L are unbalanced or the frame is unbalanced to correct the actual command value. Accordingly, the straight traveling performance of the vehicle body on the flat road is ensured.

According to the embodiment, the personal vehicle includes the acceleration meter (52) for detecting acceleration of the vehicle body. The control portion obtains a vehicle body travel speed on the basis of an integrated value obtained by integrating a measurement value of the acceleration meter with respect to time and a vehicle body travel speed on the basis of the right-hand side wheel sensor (encoder 53R) and the left-hand side wheel sensor (encoder 53L), the control portion estimates that a radius $R_{\_r}$ of the right-hand side wheel (12R) and/or a radius $R_{\_L}$ of the left-hand side wheel (12L) is changed when a difference of the vehicle body travel speed on the basis of the integrated value obtained by integrating the measurement value of the acceleration meter (52) with respect to time and the vehicle body travel speed on the basis of the right-hand side wheel sensor (encoder 53R) and the left-hand side wheel sensor (encoder 53L) or a ratio obtained by dividing a greater one of the vehicle body travel speed on the basis of the integrated value obtained by integrating the measurement value of the acceleration meter with respect to time and the vehicle body travel speed on the basis of the right-hand side wheel sensor (encoder 53R) and the left-hand side wheel sensor (encoder 53L) by a smaller one of the vehicle body travel speed on the basis of the integrated value obtained by integrating the measurement value of the acceleration meter with respect to time and the vehicle body travel speed on the basis of the right-hand side wheel sensor (encoder 53R) and the left-hand side wheel sensor (encoder 53L) is equal to or greater than a predetermined value and when a state that the difference or the ratio is equal to or greater than the predetermined value continues for a predetermined time, and the control portion (2) corrects the actual command value so that an actual vehicle body travel speed does not exceed a maximum speed limit value in response to the change in the radius (R).

For safety purposes, the maximum speed limit value (maximum legal speed limit) for vehicle body travel speed is most likely stipulated for personal vehicles. A radius of the right-hand side wheel and/or a radius of the left-hand side wheel of the personal vehicle 1 may vary, or change. For example, because the radius of the wheel increases by supplying the air to the wheel tire so that the air pressure of the tire increases or by replacing the wheel with a new wheel, the vehicle body travel speed may increase even if the rotation angular velocity of the wheel is the same (constant). In consequence, there is a possibility that the actual vehicle body travel speed of the personal vehicle exceeds the maximum speed limit value.

Two methods for obtaining the actual vehicle body travel speed may be considered. That is, the first vehicle body travel speed $V_{acc}$ is computed by the first method in which the measurement value of the acceleration meter 52 is integrated with respect to time. On the other hand, the rotation angular velocity per se of the right-hand side wheel and the left-hand side wheel can be obtained on the basis of the physical quantity related to the rotation angular velocity detected by the right-hand side wheel sensor (encoder 53R for right-hand side wheel) and the left-hand side wheel sensor (encoder 53L for left-hand side wheel). The second vehicle travel speed $V_{en}$ is computed by the second method in which a radius of the wheel is multiplied by the rotation angular velocity. Normally, the first vehicle body travel speed $V_{acc}$ and the second vehicle body travel speed $V_{en}$ accord with each other (i.e., the first vehicle body travel speed $V_{acc}$ and the second vehicle body travel speed $V_{en}$ are equal to each other). However, because the second vehicle body travel speed $V_{en}$ changes following changes in the radius of the wheel, it is possible that the second vehicle body travel speed $V_{en}$ does not accord with the first vehicle body travel speed $V_{acc}$ (i.e., the second vehicle body travel speed $V_{en}$ is assumed to be different from the first vehicle body travel speed $V_{acc}$). According to the construction of the embodiment, the control portion estimates that the radius of the wheel is changed on the basis of the difference between the first vehicle body travel speed $V_{acc}$ and the second vehicle body travel speed $V_{en}$ or on the basis of the ratio between the first vehicle body travel speed $V_{acc}$ and the second vehicle body travel speed $V_{en}$. Then, by correcting the actual command value in accordance with the changes in the radius of the wheel, the actual vehicle body travel speed of the personal vehicle is controlled so as not to exceed the maximum legal speed limit.

According to the construction of the disclosure, even when the roll angle of the personal vehicle is large because of the inclination of the road surface, as long as the operation portion 14 is operated to move the personal vehicle 1 straight in a direction to cross, or transverse the road surface 90 (i.e., the vehicle 1 is in cant travel), the control portion executes at least one of the first calculation law and the second calculation law, and further executes the third calculation law as necessity arises to obtain the actual command value for driving the right-hand side wheel and the left-hand side wheel appropriately. Thus, unintentional change in a moving direction of the vehicle body to a downward direction due to gravity of the vehicle body on the road surface 90 are corrected swiftly. Accordingly, the straight traveling performance of the personal vehicle 1 during the cant travel is favorably ensured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A personal vehicle control device for controlling a personal vehicle which includes a vehicle body including a seating portion which is configured so that a user is to be seated, a right-hand side wheel provided at the vehicle body and provided on a right side as the user seated on the seating portion faces a front of the vehicle, and a left-hand side wheel provided at the vehicle body and provided on a left side as the user seated on the seating portion faces the front of the vehicle, the personal vehicle control device comprising:
   an operation portion for inputting an original command value which includes a command value related to a turning angle of the vehicle body;
   an axis angle sensor for detecting a physical quantity related to a roll angle relative to a roll axis of the vehicle body and a physical quantity related to a turning angle relative to a yaw axis of the vehicle body;
   a right-hand side wheel sensor for detecting a physical quantity related to a rotation angular velocity of the right-hand side wheel;
   a left-hand side wheel sensor for detecting a physical quantity related to a rotation angular velocity of the left-hand side wheel; and
   a control portion executing a first calculation law in which a roll angle is determined on the basis of the physical quantity related to the roll angle detected by the axis angle sensor and in which an actual command value related to a rotation angular velocity for driving the right-hand side wheel and the left-hand side wheel is determined on the basis of the determined roll angle and the original command value, and a second calculation law in which an integrated value of a difference between the command value related to the turning angle inputted from the operation portion and the physical quantity related to the turning angle detected by the axis angle sensor with respect to time or an integrated value which is an integral of a ratio between the command value related to the turning angle inputted from the operation portion and the physical quantity related to the turning angle detected by the axis angle sensor with respect to time is determined, and in which the actual command value is determined so that the difference between the command value and the physical quantity is reduced or the ratio between the command value and the physical quantity is set to be close to one on the basis of the determined integrated value and the original command value,
   wherein the control portion determines whether a time period during which the integrated value is equal to or less than a predetermined value continues for a predetermined time and resets the integrated value to be zero in a case where the time period during which the integrated value is equal to or less than the predetermined value continues for the predetermined time.

2. The personal vehicle control device according to claim 1, wherein the control portion estimates whether an unintentional change in a moving direction of the vehicle body, which is in a cant travel, to a downward direction due to gravity occurs on the basis of the difference between the command value and the physical quantity or the ratio between the command value and the physical quantity, and executes a third calculation law for determining the actual command value so that the difference is set to be smaller or the ratio is set to be closer to one on the basis of the difference between the command value and the physical quantity or the ratio between the command value and the physical quantity, and the original command value.

3. The personal vehicle control device according to claim 1, in a state where it is determined that the vehicle body travels straight on a flat road, the control portion determines the physical quantity related to the turning angle detected by the axis angle sensor and the physical quantity related to the turning angle of the vehicle body determined on the basis of the right-hand side wheel sensor and the left-hand side wheel sensor, the control portion estimates that a radius of the right-hand side wheel and a radius of the left-hand side wheel are unbalanced or a frame of the vehicle body is imbalanced when a difference of the physical quantity related to the turning angle detected by the axis angle sensor and the physical quantity related to the turning angle of the vehicle body determined on the basis of the right-hand side wheel sensor and the left-hand side wheel sensor or a ratio determined by dividing a greater one of the physical quantity related to the turning angle detected by the axis angle sensor and the physical quantity related to the turning angle of the vehicle body determined on the basis of the right-hand side wheel sensor and the left-hand side wheel sensor by a smaller one of the physical quantity related to the turning angle detected by the axis angle sensor and the physical quantity related to the turning angle of the vehicle body determined on the basis of the right-hand side wheel sensor and the left-hand side wheel sensor is equal to or greater than a predetermined value and when a state that the difference or the ratio is equal to or greater than the predetermined value continues for a predetermined time, and the control portion corrects the actual command value.

4. The personal vehicle control device according to claim 1 further comprising:
  an acceleration meter for detecting acceleration of the vehicle body; wherein
  the control portion determines a vehicle body travel speed on the basis of an integrated value determined by integrating a measurement value of the acceleration meter with respect to time and a vehicle body travel speed on the basis of the right-hand side wheel sensor and the left-hand side wheel sensor, the control portion estimates that a radius of the right-hand side wheel or a radius of the left-hand side wheel is changed when a difference of the vehicle body travel speed on the basis of the integrated value determined by integrating the measurement value of the acceleration meter with respect to time and the vehicle body travel speed on the basis of the right-hand side wheel sensor and the left-hand side wheel sensor or a ratio determined by dividing a greater one of the vehicle body travel speed on the basis of the integrated value determined by integrating the measurement value of the acceleration meter with respect to time and the vehicle body travel speed on the basis of the right-hand side wheel sensor and the left-hand side wheel sensor by a smaller one of the vehicle body travel speed on the basis of the integrated value determined by integrating the measurement value of the acceleration meter with respect to time and the vehicle body travel speed on the basis of the right-hand side wheel sensor and the left-hand side wheel sensor is equal to or greater than a predetermined value and when a state that the difference or the ratio is equal to or greater than the predetermined value continues for a predetermined time, and the control portion corrects the actual command value so that an actual vehicle body travel speed does not exceed a maximum speed limit value in response to the change in the radius.

5. A personal vehicle control device configured to control a personal vehicle which includes a vehicle body including a seating portion which is configured so that a user is to be seated, a right-hand side wheel provided at the vehicle body and provided on a right side as the user seated on the seating portion faces a front of the vehicle, and a left-hand side wheel provided at the vehicle body and provided on a left side as the user seated on the seating portion faces the front of the vehicle, the personal vehicle control device comprising:
  an operation portion configured to input an original command value which includes a command value related to a turning angle of the vehicle body;
  an axis angle sensor configured to detect a physical quantity related to a roll angle relative to a roll axis of the vehicle body and a physical quantity related to a turning angle relative to a yaw axis of the vehicle body;
  a right-hand side wheel sensor configured to detect a physical quantity related to a rotation angular velocity of the right-hand side wheel;
  a left-hand side wheel sensor configured to detect a physical quantity related to a rotation angular velocity of the left-hand side wheel; and
  control circuitry configured to execute a first calculation law in which a roll angle is determined on the basis of the physical quantity related to the roll angle detected by the axis angle sensor and in which an actual command value related to a rotation angular velocity for driving the right-hand side wheel and the left-hand side wheel is determined on the basis of the determined roll angle and the original command value, and a second calculation law in which an integrated value of a difference between the command value related to the turning angle inputted from the operation portion and the physical quantity related to the turning angle detected by the axis angle sensor with respect to time or an integrated value which is an integral of a ratio between the command value related to the turning angle inputted from the operation portion and the physical quantity related to the turning angle detected by the axis angle sensor with respect to time is determined, and in which the actual command value is determined so that the difference between the command value and the physical quantity is reduced or the ratio between the command value and the physical quantity is set to be close to one on the basis of the determined integrated value and the original command value,
  wherein the control circuitry is configured to determine whether a time period during which the integrated value is equal to or less than a predetermined value continues for a predetermined time and reset the integrated value to be zero in a case where the time period during which the integrated value is equal to or less than the predetermined value continues for the predetermined time.

6. The personal vehicle control device according to claim 5, wherein the control circuitry is configured to estimate whether an unintentional change in a moving direction of the vehicle body, which is in a cant travel, to a downward direction due to gravity occurs on the basis of the difference between the command value and the physical quantity or the ratio between the command value and the physical quantity, and execute a third calculation law for determining the actual command value so that the difference is set to be smaller or the ratio is set to be closer to one on the basis of the difference between the command value and the physical quantity or the ratio between the command value and the physical quantity, and the original command value.

7. The personal vehicle control device according to claim 5, in a state where it is determined that the vehicle body travels straight on a flat road, the control circuitry is configured to determine the physical quantity related to the turning angle detected by the axis angle sensor and the physical quantity related to the turning angle of the vehicle body determined on the basis of the right-hand side wheel sensor and the left-hand side wheel sensor, the control circuitry is configured to estimate that a radius of the right-hand side wheel and a radius of the left-hand side wheel are unbalanced or a frame of the vehicle body is imbalanced when a difference of the physical quantity related to the turning angle detected by the axis angle sensor and the physical quantity related to the turning angle of the vehicle body determined on the basis of the right-hand side wheel sensor and the left-hand side wheel sensor or a ratio determined by dividing a greater one of the physical quantity related to the turning angle detected by the axis angle sensor and the physical quantity related to the turning angle of the vehicle body determined on the basis of the right-hand side wheel sensor and the left-hand side wheel sensor by a smaller one of the physical quantity related to the turning angle detected by the axis angle sensor and the physical quantity related to the turning angle of the vehicle body determined on the basis of the right-hand side wheel sensor and the left-hand side wheel sensor is equal to or greater than a predetermined value and when a state that the difference or the ratio is equal to or greater than the predetermined value continues for a predetermined time, and the control circuitry is configured to correct the actual command value.

8. The personal vehicle control device according to claim 5 further comprising:
- an acceleration meter configured to detect acceleration of the vehicle body; wherein
- the control circuitry is configured to determine a vehicle body travel speed on the basis of an integrated value determined by integrating a measurement value of the acceleration meter with respect to time and a vehicle body travel speed on the basis of the right-hand side wheel sensor and the left-hand side wheel sensor, the control circuitry is configured to estimate that a radius of the right-hand side wheel or a radius of the left-hand side wheel is changed when a difference of the vehicle body travel speed on the basis of the integrated value determined by integrating the measurement value of the acceleration meter with respect to time and the vehicle body travel speed on the basis of the right-hand side wheel sensor and the left-hand side wheel sensor or a ratio determined by dividing a greater one of the vehicle body travel speed on the basis of the integrated value determined by integrating the measurement value of the acceleration meter with respect to time and the vehicle body travel speed on the basis of the right-hand side wheel sensor and the left-hand side wheel sensor by a smaller one of the vehicle body travel speed on the basis of the integrated value determined by integrating the measurement value of the acceleration meter with respect to time and the vehicle body travel speed on the basis of the right-hand side wheel sensor and the left-hand side wheel sensor is equal to or greater than a predetermined value and when a state that the difference or the ratio is equal to or greater than the predetermined value continues for a predetermined time, and the control circuitry is configured to correct the actual command value so that an actual vehicle body travel speed does not exceed a maximum speed limit value in response to the change in the radius.

* * * * *